(12) United States Patent
Yang et al.

(10) Patent No.: US 11,968,678 B2
(45) Date of Patent: Apr. 23, 2024

(54) UCI MULTIPLEXING WITH PHYSICAL LAYER PRIORITY AND LCH BASED PRIORITIZATION

(71) Applicant: APPLE INC., Cupertino, CA (US)

(72) Inventors: Weidong Yang, San Diego, CA (US); Ralf Rossbach, Bavaria-Bayern (DE); Fangli Xu, Beijing (CN); Amir Aminzadeh Gohari, Cupertino, CA (US); Chunxuan Ye, San Diego, CA (US); Dawei Zhang, Cupertino, CA (US); Haijing Hu, Cupertino, CA (US); Oghenekome Oteri, San Diego, CA (US); Sigen Ye, San Diego, CA (US); Wei Zeng, Cupertino, CA (US); Wenshu Zhang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 416 days.

(21) Appl. No.: 17/593,251

(22) PCT Filed: Apr. 6, 2021

(86) PCT No.: PCT/CN2021/085708
§ 371 (c)(1),
(2) Date: Sep. 14, 2021

(87) PCT Pub. No.: WO2022/213280
PCT Pub. Date: Oct. 13, 2022

(65) Prior Publication Data
US 2023/0292320 A1    Sep. 14, 2023

(51) Int. Cl.
*H04W 72/21* (2023.01)
*H04L 1/1812* (2023.01)
(Continued)

(52) U.S. Cl.
CPC .......... *H04W 72/21* (2023.01); *H04L 1/1812* (2013.01); *H04W 72/1268* (2013.01); *H04W 72/566* (2023.01)

(58) Field of Classification Search
CPC ............. H04W 72/21; H04W 72/1268; H04W 72/566; H04W 24/02; H04L 1/1812;
(Continued)

(56) References Cited

U.S. PATENT DOCUMENTS 11,811,538 B2 * 11/2023 Papasakellariou .... H04L 1/1861
2020/0228248 A1 * 7/2020 Islam .................... H04L 1/1861
(Continued)

FOREIGN PATENT DOCUMENTS

| WO | 2020051152 A1 | 3/2020 |
| WO | 2020113433 A1 | 6/2020 |
| WO | 2020146247 A2 | 7/2020 |

OTHER PUBLICATIONS

3GPP TS 38.213, "3rd Generation Partnership Project; Technical Specification Group Radio Access Network; NR; Physical layer procedures for control (Release 16)", V16.4.0, Dec. 2020, 178 pages.
(Continued)

*Primary Examiner* — Jay P Patel
(74) *Attorney, Agent, or Firm* — Dorsey & Whitney LLP

(57) ABSTRACT

Methods and wireless communication systems are provided for uplink control information (UCI) multiplexing with physical layer (PHY) priority and logical channel (LCH) based prioritization.

20 Claims, 11 Drawing Sheets

(51) Int. Cl.
*H04W 72/1268* (2023.01)
*H04W 72/566* (2023.01)

(58) Field of Classification Search
CPC ... H04L 1/0026; H04L 1/1854; H04L 1/1671; H04L 5/0053; H04L 5/0055; H04L 5/0057
See application file for complete search history.

(56) References Cited

U.S. PATENT DOCUMENTS

| | | | | |
|---|---|---|---|---|
| 2021/0007129 A1* | 1/2021 | Talarico | ............ | H04W 72/1268 |
| 2021/0105766 A1* | 4/2021 | Wang | .................... | H04W 72/21 |
| 2021/0168848 A1* | 6/2021 | Chatterjee | ............. | H04L 1/1854 |
| 2021/0227555 A1* | 7/2021 | Lin | ........................ | H04L 5/0053 |
| 2021/0243779 A1* | 8/2021 | Takeda | .................. | H04L 1/1664 |
| 2021/0258992 A1* | 8/2021 | Huang | ............. | H04W 72/1268 |
| 2021/0320760 A1* | 10/2021 | Rastegardoost | ...... | H04L 1/0028 |
| 2022/0053522 A1* | 2/2022 | MolavianJazi | ... | H04W 72/1263 |
| 2022/0086831 A1* | 3/2022 | Yang | .................... | H04L 5/0053 |
| 2022/0086849 A1* | 3/2022 | Lee | ........................ | H04W 72/56 |
| 2022/0095324 A1* | 3/2022 | Huang | ................ | H04W 72/566 |
| 2022/0116964 A1* | 4/2022 | Islam | .................... | H04W 72/23 |
| 2022/0124745 A1* | 4/2022 | Yang | .................... | H04W 72/569 |
| 2022/0132537 A1* | 4/2022 | Wang | .................... | H04L 1/1896 |
| 2022/0150912 A1* | 5/2022 | Li | ........................ | H04W 72/569 |
| 2022/0174721 A1* | 6/2022 | Oviedo | ................. | H04W 72/21 |
| 2022/0182999 A1* | 6/2022 | Zhang | .................. | H04L 5/0023 |
| 2022/0232591 A1* | 7/2022 | Hosseini | ............. | H04W 72/569 |
| 2022/0264623 A1* | 8/2022 | Yin | ........................ | H04W 72/56 |
| 2022/0279538 A1* | 9/2022 | Jung | .................... | H04L 5/0044 |
| 2022/0287030 A1* | 9/2022 | Ling | .................... | H04L 1/1854 |
| 2023/0050541 A1* | 2/2023 | Yi | ........................ | H04L 1/1822 |
| 2023/0292320 A1* | 9/2023 | Yang | .................... | H04L 1/1671 |
| 2023/0299891 A1* | 9/2023 | Kittichokechai | ..... | H04L 1/1896 370/336 |
| 2023/0396370 A1* | 12/2023 | Yin | ........................ | H04L 1/1854 |

OTHER PUBLICATIONS

Ericsson, "UL PUSCH skipping with intra-UE prioritization", Tdoc R2-2100341, 3GPP TSG-RAN WG2 #113-e, Electronic meeting, Agenda Item 6.5.3, Jan. 25-Feb. 5, 2021, 6 pages.
PCT/CN21/085708, International Search Report and Written Opinion, dated Jan. 12, 2022, 9 pages.

* cited by examiner

UCI MULTIPLEXING WITH PHYSICAL LAYER PRIORITY AND LCH BASED PRIORITIZATION

TECHNICAL FIELD

This application relates generally to wireless communication systems, including uplink control information (UCI) multiplexing.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

1.0 Introduction

Uplink (UL) skipping for configured grant (CG) physical uplink shared channel (PUSCH) may be used in certain wireless systems. UL skipping for dynamic grant (DG) PUSCH is a UE capability. To reduce the complexity of blind detection for base stations (e.g., gNBs), for UL skipping of dynamic UL grant in non-carrier aggregation (CA) and CA cases, when there is physical uplink control channel (PUCCH) carrying UCI overlapping with a set of PUSCHs, certain designs provide that the PUSCH with UCI multiplexing from the set cannot be skipped. The media access control (MAC) layer generates a MAC protocol data unit (PDU) for the PUSCH and the UCI is multiplexed on the PUSCH. However, such designs have not yet considered physical layer (PHY) priority and logical channel (LCH) prioritization.

Certain wireless systems define UCI multiplexing rules for multiplexing hybrid automatic repeat request-acknowledgement (HARQ-ACK), scheduling request (SR), and channel state information (CSI) on the PUCCH or PUSCH channel. In such systems, the traffic may be of a single priority. With Ultra Reliable and Low Latency Communications (URLLC) transmission, there is a possibility of that a UE may need to decide what to transmit if there is a collision between the resources meant for an UL data (control transmission) and a second control transmission. In other systems (e.g., 3GPP Rel-16), for intra-UE collision handling at the PHY, in case a high-priority UL transmission overlaps with a low-priority UL transmission, the low-priority UL transmission is dropped. The following channels may be assigned a high priority (HP) and/or a low priority (LP): positive SR, HARQ-ACK, PUSCH, periodic/semi-persistent (P/SP)-CSI on PUSCH, sounding reference signal (SRS), and/or PUCCH-beam failure recover (BFR). The following channels may be assigned only low priorities: P/SP-CSI on PUUCH and/or SRS.

Prioritization of different channels (e.g., as defined in 3GPP Rel-16), may have a varying impact on network performance. For example, dropping a low priority HARQ-ACK can result in the gNB re-transmitting a correctly received enhanced mobile broadband (eMBB) physical downlink shared channel (PDSCH) if HARQ-ACK, which may impact the spectral efficiency of the network. Dropping an SR may result in the gNB not scheduling the PUSCH, which may impact just the UE that does not send the SR and may not have as much an effect of the spectral efficiency of the network. Dropping a CSI may result in spectral efficiency loss due the gNB scheduling UEs based on outdated channel state information.

Thus, certain embodiments disclosed herein provide for a UE to perform UCI multiplexing with PHY priority and LCH based prioritization.

2.0 Example PUSCH Skipping and UCI Multiplexing

Figure 1:
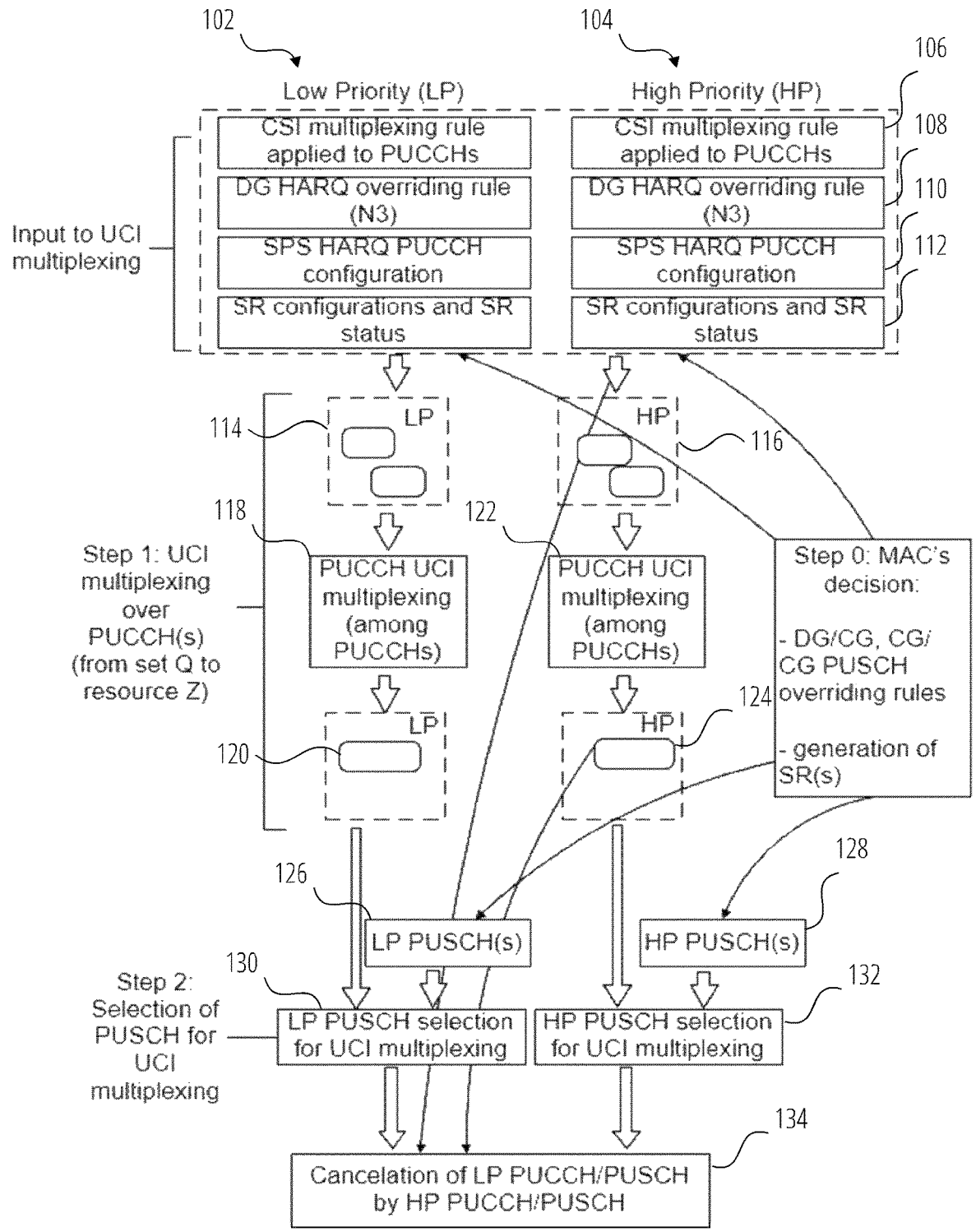
FIG. 1 is a block diagram illustrating UCI multiplexing according to certain designs.

FIG. 1 is a block diagram illustrating UCI multiplexing according to certain designs. In this example, PHY processing for UL skipping and UCI multiplexing may be described as a one-pass procedure. The PHY processing includes separate sub-processes for LP processing 102 and HP processing 104. As understood by skilled persons from the disclosure herein, both the LP processing 102 and the HP processing 104 include, as input to UCI multiplexing, a process 106 for applying CSI multiplexing rules to PUCCHs (including P/SP PUCCHs for CSI reporting), a process 108 for applying a DG HARQ overriding rule (N3) (see, e.g., section 9.2.3 of 3GPP Technical Specification (TS) 38.213), and a process 110 for SPS HARQ PUCCH configuration to determine PUCCH resource(s) for SPS HARQ reporting. The process 110 may include determining a PUCCH for dynamic HARQ reporting indicated by PRI in a downlink DCI, wherein the PUCCH overriding rule for two or more PUCCHs for dynamic HARQ reporting is executed so there is only a single PUCCH for dynamic HARQ reporting as an input to the multiplexing block.

In certain situations, the input to the UCI multiplexing may also include a process 112 for determining or assuming SR configurations and SR status, which as disclosed herein may be different for different embodiments. In the example shown in FIG. 1, in Step 0, the UE's MAC layer (which may be referred to herein as a "MAC entity" or simply the "MAC") makes decisions on DG/CG overriding, CG/CG overriding, and generation of SR(s), and indicates the decisions to the UE's PHY (which may be referred to herein as a "PHY entity"). The remaining processes shown in FIG. 1 concerning UCI multiplexing are internal to the PHY.

In Step 1 shown in FIG. 1, for LP and HP, the PHY performs UCI multiplexing over PUCCH(s) from a set Q of PUCCH resources to a PUCCH resource Z. As shown, LP channels 114 prior to UCI multiplexing and HP channels 116 prior to UCI multiplexing may respectively include overlapping PUCCH resources. The PHY performs a process 118 for PUCCH UCI multiplexing among the overlapping PUCCHs of the LP channels 114 to generate an LP PUCCH resource Z 120 from a set Q of PUCCH resources. Similarly, the PHY performs a process 122 for PUCCH UCI multiplexing among the overlapping PUCCHs of the HP channels 116 to generate an HP PUCCH resource Z 124 from the set Q of PUCCH resources. The process 118 and the process 122 for PUCCH UCI multiplexing is described, for example, in section 9.2.5 of 3GPP TS 38.213.

In Step 2 shown in FIG. 1, when conditions are met, the PHY performs a process 130 for LP PUSCH selection for UCI multiplexing among the LP PUCCH resource Z 120 and other LP PUSCH(s) 126. The PHY also performs a process 132 for HP PUSCH selection for UCI multiplexing among the HP PUCCH resource Z 124 and other HP PUSCH(s) 128. With carrier aggregation, the selected PUSCH can be a DG PUSCH, CG PUSCH, semipersistent (SP)-CSI carrying PUSCH, etc. on the same component carrier (CC) as PUCCH or on another CC. In certain implementations, different subcarrier spacing across CCs may complicate the selection procedure.

The PHY may then perform a process 134 for cancelation of LP PUCCH/PUSCH by HP PUCCH/PUSCH. See, e.g., pages 50-53 of 3GPP TS 38.213 V16.4.0.

2.1 SR Status

In NR, when a PUCCH resource for HARQ-ACK and a PUCCH resource for SR collide and are both with PUCCH format 1 (PF1), resource selection is used. If SR is positive, then the HARQ-ACK is transmitted over the PUCCH resource for SR. If SR is negative, then the HARQ-ACK is transmitted over the PUCCH resource for HARQ-ACK itself. Herein, a positive SR indicates the presence of UL data to be transmitted by a UE, and a negative SR indicates the absence of UL data to be transmitted by the UE.

Figure 2:
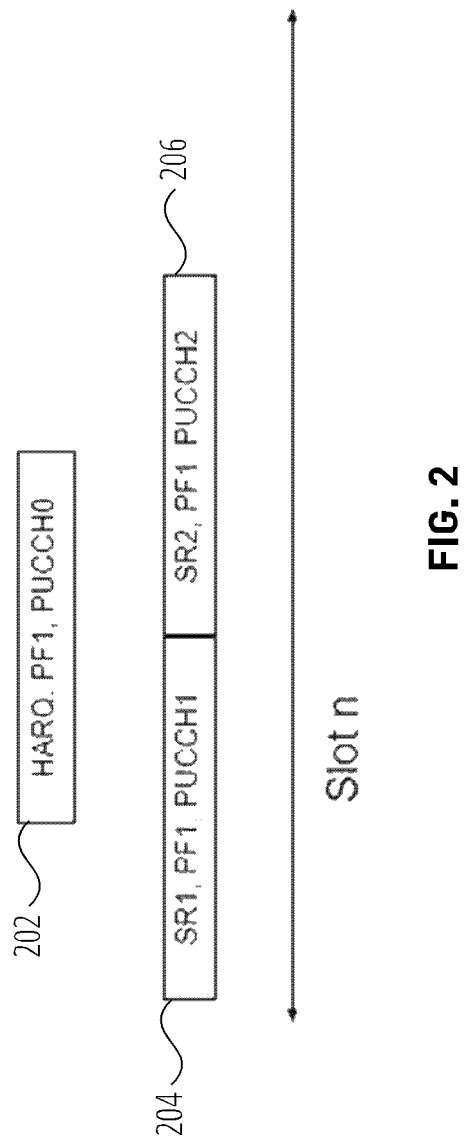
FIG. 2 is a block diagram illustrating an example of colliding PUCCH resources for HARQ-ACK and SR according to certain embodiments.

For example, FIG. 2 is a block diagram illustrating an example of colliding PUCCH resources for HARQ-ACK and SR. As shown, a PUCCH resource 202 for HARQ-ACK (shown as PUCCH0) overlaps in slot n with a first PUCCH resource 204 for SR1 (shown as PUCCH1) and a second PUCCH resource 206 for SR2 (shown as PUCCH2). Each of the PUCCH resource 202, first PUCCH resource 204, and second PUCCH resource 206 are configured for PF1). Depending on SR status, four cases can arise: when both SR1 and SR2 are negative, HARQ-ACK is sent on PUCCH0; when SR1 is positive and SR2 is negative, HARQ-ACK is sent on PUCCH1; when SR2 is positive and SR1 is negative, HARQ-ACK is sent on PUCCH2; and when both SR1 and SR2 are positive, HARQ-ACK is sent on PUCCH1 and SR2 is sent over PUCCH2.

Within PHY's multiplexing block (see, e.g., section 9.2.5 of 3GPP TS 38.213), the generation of PUCCH resource Z from set Q is conducted over overlapping PUCCHs. Then depending on the outcome of the PUCCH resource for HARQ-ACK considering UCI payload size including HARQ-ACK and SR, the resource Z generated can be different. Since the gNB cannot control the SR status at a UE, blind detection on the gNB side for different outcomes is inevitable under such conditions. The uncertainty in the resource Z generation may not incur complexity on the UE side, as the UE PHY performs all the processing with information on SR status from the MAC (i.e., the PHY is not tasked to track all the alternative outcomes). However, as discussed below, the complexity for may increase in other scenarios.

To mitigate the uncertainty in UCI multiplexing, the occurrence of colliding HARQ-ACK PUCCH resource at PUCCH format 1 and SR PUCCH resource at PUCCH format 1 should be avoided. Thus, in certain embodiments, HARQ-ACK PUCCH resource and SR PUCCH resource cannot be both configured with PUCCH format 1. In another embodiment, when HARQ-ACK PUCCH resource and SR PUCCH resource overlap, then HARQ-ACK PUCCH resource and SR PUCCH resource are not both at PUCCH format 1.

In certain embodiments, when HARQ-ACK PUCCH resource and SR PUCCH resource both configured with PUCCH format 1 collide, then a PUCCH resource for HARQ-ACK with payload more than two bits is used. Zero padding may be used to minimize specification change and implementation change. In such embodiments, the payload may be given by HARQ bit(s)+SR bit+zero or more padding bit. If there are two HARQ-ACK bits, then the one SR bit is included in the payload such that there are three bits in the payload (2 HARQ-ACK bits+1 SR bit). If there is one HARQ-ACK bit, then one SR bit and one padding bit are included such that there are three bits in the payload (1 HARQ-ACK bit+1 SR bit+1 padding bit). When UCIs may be at different physical layer priorities, for cases with combinations {HP (High Priority) SR at PUCCH Format 0, LP (Low Priority) HARQ-ACK at PUCCH Format 0}, or {HP SR at PUCCH Format 1, LP HARQ-ACK at PUCCH Format 1}, or {HP SR at PUCCH Format 1, LP HARQ-ACK at PUCCH Format 0}, if there are 2 HARQ-ACK bits and 1 SR bit, then 3 bits ($O_{UCI}$=3 bits) are used to look up a HP PUCCH resource: if such a HP PUCCH resource is not available, then the LP UCI is discarded; and the HP UCI is carried over its configured PUCCH resource; if such a HP PUCCH resource is available, then all 3 bits are included in the payload. If there are 1 HARQ-ACK bit and 1 SR bit, then 1 padding bit is included with them so 3 bits ($O_{UCI}$=3 bits) are used to look up a HP PUCCH resource. If such a HP PUCCH resource is not available, then the LP UCI is discarded; and the HP UCI is carried over its configured PUCCH resource. If such a HP PUCCH resource is available, then 3 bits are counted in the payload (1 HARQ-ACK bit+1 SR bit+1 padding bit). Alternatively, instead of using padding, the HP UCI bit can be repeated: [1 HP bit, 1 HP bit, 1 LP bit].

When UCIs may be at different physical layer priorities, for cases with combinations {HP HARQ-ACK at PUCCH Format 0, LP HARQ at PUCCH Format 0}, or {HP HARQ-ACK at PUCCH Format 1, LP HARQ at PUCCH Format 1}, or {HP HARQ at PUCCH Format 1, LP HARQ at PUCCH Format 0}, If there are $O_1$ HP HARQ-ACK bit(s), $O_2$ LP HARQ-ACK bit(s), $O_{UCI}=O_1+O_2 \geq 3$, then $O_{UCI}$ is used to look up a HP PUCCH resource set/HP PUCCH resource.
If such a HP PUCCH resource is not available, then the LP UCI is discarded; and the HP UCI is carried over its configured PUCCH resource.
If such a HP PUCCH resource is available, 3 bits are included in the payload.
If there are 1 HP HARQ-ACK bit, 1 LP HARQ bit (i.e. $O_1+O_2=2$), then 1 padding bit included with them, $O_{UCI}$=3 bits is used to look up a HP PUCCH resource set/HP PUCCH resource.
If such a HP PUCCH resource is not available, then the LP UCI is discarded; and the HP UCI is carried over its configured PUCCH resource.
If such a HP PUCCH resource is available, then 3 bits are counted in the payload (1 HP HARQ-ACK bit+1 LP HARQ bit+1 padding bit).
Alternatively, instead of using padding, repetition of the 1 HP HARQ-ACK bit can be also considered: [1 HP HARQ-ACK bit, 1 HP HARQ-ACK bit, 1 LP HARQ-ACK bit].

A number of considerations are provided below for multiplexing UCIs at different physical layer priorities.

The circular shifts in PUCCH Format 0 that have indices closer to each other may have more difficulty in being decoded or separated due to channel dispersal and to mitigate this the sequences can be separated in a manner as to maximize the separation between signals to maximize reliability. In one example, HARQ-ACK bits are mapped to the first two more reliable bits i.e. HARQ-ACK(HP), HARQ-ACK(LP), SR(HP/LP))). In one example, all data from the high priority UCIs is mapped to the first two bits i.e. (HARQ-ACK (HP), SR(HP), HARQ-ACK(LP)).

When multiplexing of different PUCCH types, they are multiplexed only if they satisfy specific timelines. These could be deterministic, or rule based. In the deterministic case, if a LP PUCCH 1 overlaps with multiple HP PUCCHs, then the LP PUCCH 1 can be multiplexed with a predetermined high priority PUCCH. This may be the first, 2nd, ..., last high priority PUCCH. The specific PUCCH may be pre-determined by signaling. In the rule-based case, if a LP PUCCH 1 overlaps with multiple HP PUCCHs, then the LP PUCCH 1 can be multiplexed with any high priority PUCCH. Any of the HP PUCCHs may be used. The gNB may have to blindly search for the PUCCH resource used. To ensure a common understanding by both the gNB and UE, the UE may send some additional signal indicating the PUCCH that it is multiplexed with e.g. 2-level signaling. In another solution, the UE may send information in the first HP PUCCH that indicates the PUCCH resource used by the LP PUCCH. In one example, the 1st HP PUCCH is not used for multiplexing and with the additional signaling, the gNB knows exactly which PUCCH resource to check. In one example, the 1st HP PUCCH may be used for multiplexing. The gNB checks for the HP PUCCH with further signaling and for multiplexing with the first PUCCH.

An HP PUCCH that is multiplexed with a LP PUCCH may increase its number of symbols by a certain amount. This amount may be configured or may be have fixed by specification. This prevents an increase in the latency of decoding the HP PUCCH due to multiplexing with a LP PUCCH. Note that this may be different for the different PUCCH Format types. For PUCCH Format 0 or 2 this may be 1 or 2 symbols. For PUCCH Formats 1, 3 and 4 this may range up to 14 symbols.

If both URLLC and eMBB UCI include only HARQ acknowledgements, the identification of the resource set is done by the UE and based on the number of URLLC UCI bits, the number of eMBB UCI bits and the total number of bits configured for multiplexed transmission. There are multiple ways that this handled. In one alternative, the UE selects the PUCCH resource set to be used based on both the URLLC and eMBB UCI bits to be transmitted. The resource can be selected as the sum of the UCIs for both UEs (no dropping, PUCCH resource set is selected based on both). In this case, PUCCH Resource set x (N)=N1 (URLLC UCI)+N2 (eMBB UCI) where N is the number of bits used to determine the resource set X. In one alternative, the PUCCH resource set is selected as the sum of the UCIs for both UEs subject to a configured maximum N_urllc_config. If greater than the maximum then N_urllc_config bits are transmitted. (Partial dropping occurs, format based on URLLC UCI). In an example, N_urllc_config may be such PUCCH Resource set x (N) is not greater than PR set x(N1). In this case, it stays within the same resource set as the original URLLC transmission only. The UE selects the PUCCH resource set to be used based on the URLLC UCI bits to be transmitted. The UE may then add the eMBB bits within this resource set. To limit the jumping between sets, a rule may be set such that N_urllc_config does not increase by more than 1 set from the resource set as the original URLLC transmission i.e. PUCCH_Resource set x (N)=maximum (N1+N2, N_urllc_config). In one alternative, the UE selects the PUCCH resource set to be used based on the sum of the UCIs for both UEs subject to a configured maximum. If the sum is greater than the maximum then the maximum (N1 bits) are transmitted. There is no multiplexing and the eMBB UCI bits are dropped. PUCCH Resource set x (N)=N1+N2 if N1+N2<N_urllc_config else N1. In another solution, the UE uses configuration information from the gNB to select the PUCCH resource set directly based on the mixed traffic.

2.1.1 Multiple Positive SRs in a Slot

From the multiple bit SR encoding in the PHY specification, there are (K+1) code states supported: one code state for all K SRs being negative; and one code state for each SR being positive. So, it may be that only one SR out of K SR resources can be associated with a positive status. However, the design itself does not exclude the possibility where there can be multiple positive SRs in a slot. In certain embodiments, there can be at most two PUCCHs in a slot, presumably both can carry positive SRs.

2.2 PUSCH Selection

For UCI multiplexing, from the PUSCHs which are to be transmitted in a slot over one or more CCs, the UE's PHY entity decides which PUSCH, if any, will be multiplexed with UCI. UL skipping, either for CG PUSCH or DG PUSCH, is handled by the MAC entity. Thus, checking by the PHY entity may not be necessary. Rather, the PHY entity just handles the aftermath of any UL skipping decision by the MAC.

Note that in certain designs, selection of PUSCH for UCI multiplexing may follows a complicated procedure. A clarification to 3GPP Rel-15 for UE behavior indicates that for UCI multiplexing, within a PUCCH group, on PUSCH, the following two steps are performed with step 1 followed by step 2. In step 1, UCI in overlapped PUCCH transmissions is multiplexed into one PUCCH resource (resource Z), per PUCCH slot. In step 2, UCI that does not include SR in Z is multiplexed into one PUSCH, if Z overlaps with at least one PUSCH, following the five priorities (sequentially from high to low) listed below. A first priority is for PUSCH with A-CSI as long as it overlaps with Z. A second priority is for the earliest PUSCH slot(s) based on the start of the slots. IF there are still multiple PUSCHs overlapped with Z in the earliest PUSCH slot(s), follow the following priorities (sequentially from high to low). A third priority is for DG PUSCHs>PUSCHs configured by respective ConfiguredGrantConfig or semiPersistentOnPUSCH configured grant PUSCHs. A fourth priority is for PUSCHs on serving cell with smaller serving cell index>PUSCHs on serving cell with larger serving cell index. A fifth priority is for earlier PUSCH transmission>later PUSCH transmission. The clarification applies to both cases with the same (except the second priority part) and different numerologies among PUCCH and PUSCHs.

Accordingly, DG PUSCH, CG PUSCH and PUSCH carrying SPS-CSI are candidates for UCI multiplexing. Also for CG PUSCH, for the procedure to be executable without involving back-and-forth interaction between MAC and PHY, the reference to CG PUSCH in the above clarification is to actual CG PUSCH transmission not to CG PUSCH transmission occasion. Also, the SPS-CSI carrying PUSCH referred in the procedure refers to an actual PUSCH transmission in a slot, not just a SPS-CSI carrying PUSCH transmission occasion.

For the third priority above, DG PUSCHs>PUSCHs configured by respective ConfiguredGrantConfig or semiPersistentOnPUSCH. As there is no MAC PDU generated for SP-CSI carrying PUSCH, designs using MAC PDU generation only for UL skipping do not fit the 3GPP Rel-15 design.

DG PUSCHs, CG PUSCHs, and PUSCHs configured by semiPersistentOnPUSCH are candidates for UCI multiplexing. A PUSCH without MAC PDU can be selected for UCI multiplexing. With clarification indicated above, when the case SP CSI over PUSCH is present, even if a PUCCH overlaps with CG PUSCH occasion, the UCI over PUCCH is not necessarily multiplexed to CG PUSCH. Further, PUSCH selection for UCI multiplexing may work with candidates over all CC. Not directly working with the current PUSCH selection procedure, but instead trying to examine the cases over a single CC and extend the solution to multiple CCs can be problematic.

Using a few examples with overlapping channels in discussion is helpful to understand the complex nature of the underlying design issue, but the complex nature of UCI multiplexing may not be adequately covered by such examples. As a UE has considerable autonomy in using CG PUSCH (subject to restrictions concerning DG/CG PUSCHs in PHY and MAC specifications), CG PUSCH transmission may not be precisely controlled by the gNB. Thus, there may be uncertainty in PUSCH selection for UCI multiplexing once CG configuration is activated.

From the above observations, SR status and CG PUSCH may make full alignment in UCI multiplexing between UE and gNB difficult. Both SR status and CG PUSCH depend on the exact buffer status and traffic arrival at UE. Thus, the gNB cannot be expected to be aware of their instantaneous status. Through gNB configuration, the gNB can mitigate the uncertainty in UCI multiplexing to its own advantage.

3.0 Example UCI Multiplexing and PUSCH Skipping

Figure 3:
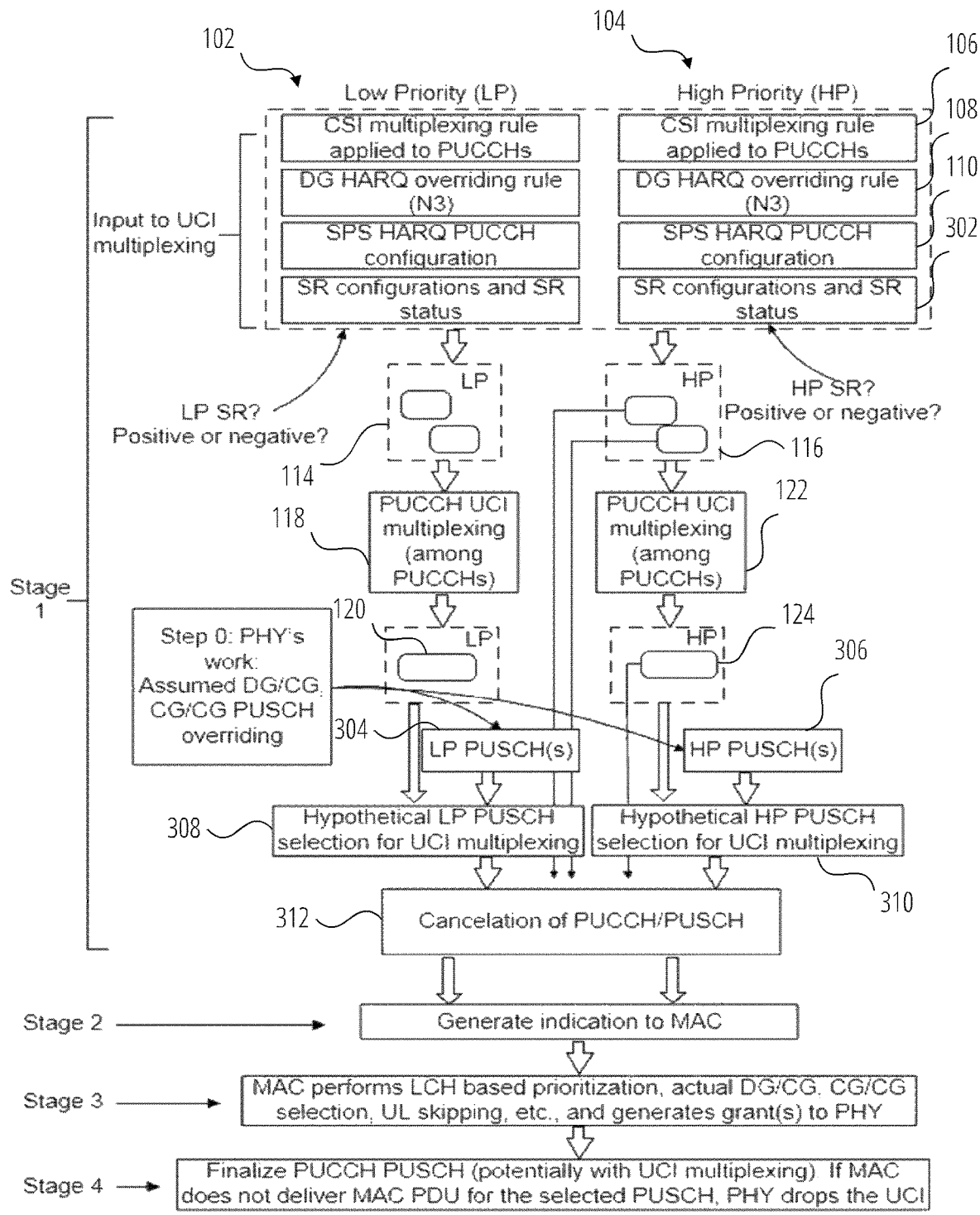
FIG. 3 is a block diagram illustrating UCI multiplexing with PHY indication of PUSCH with UCI multiplexing to MAC according to certain embodiments.

FIG. 3 is a block diagram illustrating UCI multiplexing with PHY indication of PUSCH with UCI multiplexing to MAC according to certain embodiments. Similar to the example shown in FIG. 1, the UCI multiplexing shown in FIG. 3 includes separate sub-processes for LP processing 102 and HP processing 104. The example shown in FIG. 3 also includes the inputs to UCI multiplexing (process 106, process 108, and process 110), the LP channels 114 and HP channels 116 with overlapping PUCCH resources, and the PUCCH UCI multiplexing (process 118 and process 122) to generate the LP PUCCH resource Z 120 and/or the HP PUCCH resource Z 124 shown in FIG. 1. However, in the example shown in FIG. 3, the UE's PHY does not receive any indication concerning SR status or CG PUSCH(s) from the UE's MAC. Rather, in certain embodiments for both LP processing 102 and HP processing 104, the PHY performs a process 302 to avoid the occurrence of HARQ-ACK PUCCH resource at PUCCH format 1 and SR PUCCH resource at PUCCH format 1.

For the UCI multiplexing shown in FIG. 3, the PHY identifies a PUSCH for UCI multiplexing and indicates to MAC the identified PUSCH is a target for UCI multiplexing. The MAC considers the PHY's request when generating a MAC PDU (i.e., the identified PUSCH is a target for UCI multiplexing). In parallel, the PHY assumes the previously identified PUSCH is available for UCI multiplexing and can perform any preparatory processing for UCI multiplexing accordingly.

For embodiments configured for physical layer priority and/or 1ch-basedPrioritization, as shown in FIG. 3, in a Stage 1, the PHY assumes (see Step 0) DG/CG, CG/CG PUSCH overriding for LP PUSCH(s) and HP PUSCH(s). The PHY performs a process 308 for hypothetical LP PUSCH selection for UCI multiplexing among the LP PUCCH resource Z 120 and other LP PUSCH(s) 304. The PHY also performs a process 310 for hypothetical HP PUSCH selection for UCI multiplexing among the HP PUCCH resource Z 124 and other HP PUSCH(s) 306. To finalize identification of a PUSCH for UCI multiplexing, the PHY performs a process 312 for cancelation of PUCCH/PUSCH (see, e.g., pages 50-53 of 3GPP TS 38.213 v16.4.0).

In a Stage 2 shown in FIG. 3, the PHY indicates to the MAC the identified PUSCH selected by the PHY for UCI multiplexing. In a Stage 3, the MAC generates MAC PDU considering the PHY's request. In parallel, the PHY assumes the previously identified PUSCH is available for UCI multiplexing and performs any preparatory processing for UCI multiplexing. The MAC PDU arrives to the PHY in the form of a transport block. In a Stage 4, the PHY takes the transport block(s) from MAC and finalizes PUCCH/PUSCH transmission. If UCI multiplexing is assumed to be carried over a PUSCH in Stage 2, yet the MAC fails to deliver the transport block for the PUSCH selected by the PHY for UCI multiplexing, or the MAC delivers a transport block which blocks the generation of the PUSCH selected by the PHY for UCI multiplexing (e.g., SP-CSI over PUSCH without UL-SCH), then the UCI can be dropped, as discussed in detail below.

As shown in Stage 1, in the example shown in FIG. 3, the PHY may need to first identify a PUSCH for UCI multiplexing, if any. However, when the PHY identifies the PUSCH for UCI multiplexing, the MAC has not made a decision concerning whether or what MAC PDUs will be generated for the slot of interest. Thus, the selection of PUSCH for UCI multiplexing in Stage 1 is over hypothetical PUSCH transmissions assumed by the PHY at the time, rather than actual PUSCH transmissions (as in the example shown in FIG. 1). Certain embodiments disclosed herein provide for UCI multiplexing when the PHY identifies hypothetical PUSCH transmissions rather than actual PUSCH transmissions.

For L1 intra-UE prioritization, since actual PUSCHs are not assumed to be known at Stage 1, the process 312 may include a few options. For example, DG PUSCHs are included in the intra-UE prioritization, but CG PUSCHs are excluded. In another option, only PUCCHs are included. The processing order of PUSCH selection and intra-UE prioritization may be affected.

3.1 SR Status

As discussed above, uncertainty may be created by overlapping PUCCH resources for HARQ-ACK/SR at PUCCH format 1. For the example shown in FIG. 1, this is may be an issue for gNB blind detection, but not be a problem for UE complexity. For the example shown in FIG. 3, however, overlapping PUCCH resources for HARQ-ACK/SR at PUCCH format 1 may increase complexity for the UE. For example, a "chicken-egg" situation may be created when the MAC requires a PHY indication for the MAC's decision making, and at the same time the PHY requires MAC's decision for UCI multiplexing. A goal for developing UL skipping related UCI multiplexing was to minimize gNB blind detection. Hence, even if the MAC could furnish the PHY with its decision (i.e., concerning SR and configured grant generation), and if the PHY could take that into consideration in its processing, the outcome of UCI multiplexing would be changed one way or another due to the MAC's decision, over which gNB has no control or knowledge, which may not fulfill the original design goal. Thus, the outcome of UCI multiplexing should be affected as little as possible by factors outside gNB's control, e.g. the SR status.

Thus, to avoid the uncertainty created by overlapping PUCCH resources for HARQ-ACK/SR at PUCCH format 1, certain embodiments reduce or remove the uncertainty so the complicated processing leads to something useful to some entity (e.g., the gNB). In some embodiments, the PHY at Stage 1 does not expect its processing to be changed by SR status and configured grant PUSCHs. Consequently, the PHY does not receive any indication from the MAC concerning SR status or configured grant PUSCH(s). In other embodiments, the UE PHY works with known SR status at the input of the UCI multiplexing procedure.

In certain embodiments, to mitigate the uncertainty in UCI multiplexing, the occurrence of HARQ-ACK PUCCH resource at PUCCH format 1 and SR PUCCH resource at PUCCH format 1 is avoided. In one such embodiment, a HARQ-ACK PUCCH resource and a SR PUCCH resource cannot be both configured with PUCCH format 1. In another embodiment, if a HARQ-ACK PUCCH resource and a SR PUCCH resource overlap, then the HARQ-ACK PUCCH resource and the SR PUCCH resource will not both be at PUCCH format 1. In another embodiment, the PHY assumes that the SR(s) is negative in Stage 1. In another embodiment, the PHY assumes that the SR is positive in Stage 1.

3.2 Positive SR Vs PUSCH without UL-SCH

In certain systems, the following rules may be followed for SP-CSI on PUSCH or A-CSI-only on PUSCH colliding with SR/HARQ-ACK with the same starting symbol within the same CC: drop A-CSI-only on PUSCH, transmit SR on PUCCH; when SR is positive, drop A-CSI-only on PUSCH, transmit SR and HARQ-ACK on PUCCH; when SR is positive, drop SP-CSI on PUSCH, transmit SR on PUCCH; and/or when SR is positive, drop SP-CSI on PUSCH, transmit HARQ-ACK and SR on PUCCH.

In certain systems (e.g., see section 9 of 3GPP TS 38.213), if PUSCH without uplink shared channel (UL-SCH) (AP CSI only PUSCH or SP-CSI PUSCH) on CC1 overlaps with a PUCCH with positive SR on CC2 (CC2 can be the same or different cell as CC1), then the PUSCH is dropped because the buffer status report (BSR) cannot be sent over a PUSCH without UL-SCH. Thus, to ensure buffer status update, the PUSCH without UL-SCH is dropped. Note that PUSCH with AP-CSI is actually considered the priority for PUSCH multiplexing. As whether SR is positive or negative is not known at the gNB, there will be uncertainty in determining where to look for UCIs on the gNB side. Thus, considering UCI multiplexing including SR over PUSCH without UL-SCH may be considered to avoid contradictory treatments for non-SR UCI transmission and positive SR transmission.

In certain embodiments, if a UE would transmit on a serving cell a PUSCH without UL-SCH that overlaps with a PUCCH transmission on a serving cell that includes positive SR information, the UE does not transmit the PUSCH. In certain such embodiments, in Stage 1, the PHY may assume a status for SR (e.g., the PHY assumes the SR is negative or the PHY assumes the SR is positive). If the PHY assumes the SR is negative or the PHY assumes the SR is positive, then the PHY may make an additional assumption (e.g., the PHY assumes the SR is to be negative for treatment on SR vs PUSCH without UL-SCH).

When the SR status becomes known to PHY at Stage 4, then all the previous processing concerning SR should not have any dependence on SR status, according to certain embodiments. Otherwise, the PHY may have too many hypotheses for PUCCH resource Z to track.

3.3 Complications with SP CSI PUSCH Transmission

In certain systems (e.g., see section 5.2.5 of 3GPP TS 38.214 discussing priority rules for CSI reports), if a semi-persistent CSI report to be carried on PUSCH overlaps in time with PUSCH data transmission in one or more symbols on the same carrier, and if the earliest symbol of these PUSCH channels starts no earlier than $N_2+d_{2,1}$ symbols after the last symbol of the DCI scheduling the PUSCH where $d_{2,1}$ is the maximum of the $d_{2,1}$ associated with the PUSCH carrying semi-persistent CSI report and the PUSCH with data transmission, the CSI report is not transmitted by the UE. Otherwise, if the timeline requirement is not satisfied this is an error case.

Further, if a UE would transmit a first PUSCH that includes semi-persistent CSI reports and a second PUSCH that includes an UL-SCH and the first PUSCH transmission would overlap in time with the second PUSCH transmission, the UE does not transmit the first PUSCH and transmits the second PUSCH. The UE expects that the first and second PUSCH transmissions satisfy timing conditions for PUSCH transmissions that overlap in time when at least one of the first or second PUSCH transmissions is in response to a DCI format detection by the UE. Thus, SP-CSI PUSCH is dropped if it overlaps with a PUSCH with data transmission. With data skipping configured for configured grant PUSCH and dynamic grant PUSCH with UL-SCH, whether a PUSCH transmission occasion with UL-SCH leads to an actual transmission is not known by PHY at Stage 1: if the PUSCH with UL-SCH (the "second PUSCH" in 3GPP TS 38.214) is skipped, then SP-CSI PUSCH is transmitted; and/or if the PUSCH with UL-SCH (the "second PUSCH" in 3GPP TS 38.214) is not skipped, then SP-CSI PUSCH is dropped.

As the PHY's indication on PUSCH with UCI multiplexing is intended to influence the MAC's decision on MAC PDU generation, in certain embodiments it is simpler to exclude SP CSI PUSCH from consideration for UCI multiplexing otherwise cyclic dependence would ensue. A variation may also be considered wherein if SP CSI PUSCH does not overlap with any transmission occasion of PUSCH with UL-SCH, then it is eligible for being considered for UCI multiplexing. Otherwise SP CSI PUSCH is excluded from the consideration.

3.4 Stage 1

As discussed above, once CG configurations for CG Type 1 and CG activation for CG Type 2 are provided to the UE, the gNB does not have control on the occurrence of CG PUSCH. Certain embodiments herein reduce the uncertainty between the gNB and the UE, wherein the PHY in Stage 1 shown in FIG. 3 uses hypothetical PUSCH transmissions as candidates for UCI multiplexing for each physical layer priority.

3.4.1 DG PUSCH

In certain embodiments, the PHY includes DG PUSCH in the hypothetical PUSCHs transmissions as candidates for UCI multiplexing in Stage 1.

3.4.2 CG PUSCH Occasions

In certain systems (e.g., 3GPP Rel-16), for CG PUSCHs, multiple CG PUSCH configurations are allowed to overlap in time on the same CC. For the PHY to decide among all the overlapping CG PUSCHs (where some of them may overlap with DG PUSCHs) which CG PUSCH(s) to include as candidates for UCI multiplexing can be a convolved work, and the PHY may not even have the necessary information to make a determination (e.g., the PHY may not have sufficient information to determine whether DG PUSCH overrides CG PUSCH or a whether HP CG PUSCH overrides a LP DG PUSCH).

To handle the question whether CG PUSCHs should be allowed as candidates for UCI multiplexing in Stage 1, in one embodiment (CG-Alt. 1), the PHY does not consider CG PUSCHs as hypothetical PUSCH transmissions in Stage 1.

In another embodiment (CG-Alt. 2), the PHY considers CG PUSCHs as hypothetical PUSCH transmissions in Stage 1 and uses rules to deal with CG/CG, CG/DG overlapping and potentially with different physical layer priorities. In one such embodiment, every CG PUSCH occasion meeting a timeline condition (e.g., see section 9.2.5 of 3GPP TS 38.213) is assumed to be a candidate for UCI multiplexing, if the CG PUSCH does not overlap with a DG PUSCH or a CG PUSCH candidate previously admitted as one of the hypothetical PUSCH transmissions. Further details are discussed below.

3.4.3 SP-CSI PUSCH

For PUSCHs configured by semiPersistentOnPUSCH, in one embodiment (SP-Alt. 1), PUSCHs configured by semiPersistentOnPUSCH are not included in the hypothetical PUSCH transmissions in Stage 1. When a positive SR collides with SP CSI PUSCH, SP CSI PUSCH should be dropped according to the 3GPP Rel-15 NR design. Here, the status of SR (positive or negative) is not assumed to be known by the PHY. If the PHY assumes the overlapping SR is negative, then SP-CSI PUSCH can be included for UCI multiplexing. If the overlapping SR turns out to be positive, then the PHY drops the SP-CSI PUSCH.

In another embodiment (SP-Alt. 2), PUSCHs configured by semiPersistentOnPUSCH are considered as hypothetical PUSCH transmissions in Stage 1. Since in 3GPP Rel-16, SP-CSI carrying PUSCH is always of the low physical layer priority, for high physical layer priority, PUSCHs configured by semiPersistentOnPUSCH are not included. Further details are discussed below.

Therefore, depending on the choice taken for the inclusion in the hypothetical PUSCH transmissions for Stage 1 concerning CG PUSCHs and PUSCHs configured by semiPersistentOnPUSCH, there can be four solutions ({CG-Alt. 1, SP-Alt. 1}, {CG-Alt. 1, SP-Alt. 2}, {CG-Alt. 2, SP-Alt. 1}, {CG-Alt. 2, SP-Alt. 2}). Note that such selection of PUSCH may need to be conducted for each physical layer priority.

Then for Stage 1, according to certain embodiments, a modified Step 2 from the clarification to 3GPP Rel-15 discussed above is used if {CG-Alt. 1, SP-Alt. 1} is taken as follows. At each physical layer priority, for UCI multiplexing, within a PUCCH group, on PUSCH, the following two steps are performed with step 1 followed by step 2. In step 1, UCI in overlapped PUCCH transmissions is multiplexed into one PUCCH resource (resource Z), per PUCCH slot. In step 2, UCI that does not include SR in Z is multiplexed into one PUSCH, if Z overlaps with at least one PUSCH, following the priorities (sequentially from high to low) listed below. A first priority is for PUSCH with A-CSI as long as it overlaps with Z. A second priority is for the earliest PUSCH slot(s) based on the start of the slots. If there are still multiple PUSCHs overlapped with Z in the earliest PUSCH slot(s), follow the following priorities (sequentially from high to low). A next priority is for PUSCHs on serving cell with smaller serving cell index>PUSCHs on serving cell with larger serving cell index. Another priority is for earlier PUSCH transmission>later PUSCH transmission. The clarification applies to both cases with the same (except the second priority part) and different numerologies among PUCCH and PUSCHs.

Then for Stage 1, according to certain embodiments, a modified Step 2 from the clarification to 3GPP Rel-15 discussed above is used if {CG-Alt. 2, SP-Alt. 2} is taken as follows.

At each physical layer priority, for UCI multiplexing, within a PUCCH group, on PUSCH, the following two steps are performed with step 1 followed by step 2. In step 1, UCI in overlapped PUCCH transmissions is multiplexed into one PUCCH resource (resource Z), per PUCCH slot. In step 2, UCI that does not include SR in Z is multiplexed into one PUSCH, if Z overlaps with at least one PUSCH, following the priorities (sequentially from high to low) listed below. A first priority is for PUSCH with A-CSI as long as it overlaps with Z. A second priority is for the earliest PUSCH slot(s) based on the start of the slots. If there are still multiple PUSCHs overlapped with Z in the earliest PUSCH slot(s), follow the following priorities (sequentially from high to low). A third priority is for dynamic grant PUSCHs>PUSCHs configured by respective ConfiguredGrantConfig>semiPersistentOnPUSCH. A fourth priority is for PUSCHs on serving cell with smaller serving cell index>PUSCHs on serving cell with larger serving cell index. A fifth priority is for earlier PUSCH transmission>later PUSCH transmission. The clarification applies to both cases with the same (except the second priority part) and different numerologies among PUCCH and PUSCHs.

As discussed below, handling PUSCH with repetition may be complicated. One issue is that the gNB may need to perform blind detection for a first repetition to ascertain its presence and then may proceed to detect UCIs multiplexed on a subsequent repetition. Thus, in certain embodiments, it may be beneficial to define a rule to prioritize PUSCH with a single transmission over PUSCH with repetition. The third priority rule may be modified as: dynamic grant PUSCHs>PUSCHs configured by respective ConfiguredGrantConfig>semiPersistentOnPUSCH, and PUSCH without repetition is prioritized over a subsequent transmission for PUSCH with repetition.

3.5 Stage 2

Depending on the nature of UCI in PUCCH resource Z (e.g., whether the UCI includes HARQ-ACK, CSI, or SR), the MAC may decide whether generating MAC PDU simply to safeguard the transmission of CSI only UCI is warranted or not.

Note that with the SR related information in resource Z provided by PHY, if the PUSCH selected for UCI multiplexing is with UL-SCH, the MAC has the choice to either prioritize SR's transmission by not generating a MAC PDU for any PUSCH which would collide with resource Z, or the MAC can prioritize UCI multiplexing (excluding SR) by generating MAC PDU for the PUSCH selected for UCI multiplexing. If, on the other hand, the PUSCH selected for UCI multiplexing is without UL-SCH, the MAC has the choice to indicate to the PHY not to multiplex UCIs over the PUSCH selected for UCI multiplexing by the PHY, by providing positive SR in Stage 4 to allow the PHY to check whether it can send UCIs over resource Z.

For each physical layer priority, considering the alternatives in Stage 1 concerning CG PUSCH/SP-CSI PUSCH, the PHY in Stage 2 shown in FIG. 3 sends an indication to the MAC concerning the selected PUSCH, which can be a DG PUSCH, CG PUSCH, or SP CSI PUSCH, including its starting symbol and duration. The corresponding physical layer priority of the selected PUSCH may also be indicated to the MAC. Note that in certain systems (e.g., 3GPP Rel-16) SP CSI over PUSCH is always at the low physical layer priority. Thus, in such systems, for the low physical layer priority, a selected PUSCH at the high physical layer priority can be either a DG PUSCH or CG PUSCH from Stage 1. In other systems, SP CSI over PUSCH at the high physical layer priority can be also selected by the UE from Stage 1.

If SP-CSI carrying PUSCH is selected for UCI multiplexing, and the MAC needs to protect that PUSCH (e.g., by not generating MAC PDU for a PUSCH that would overlap with the SP-CSI carrying PUSCH), the starting symbol and duration of the SP-CSI carrying PUSCH may be made available to the MAC. For a resource Z, the following may be indicated to the MAC: the starting symbol and duration (the number of OFDM symbols in the PUCCH); and/or the UCI payload including information about SR (e.g., SR resource IDs) conveyed in resource Z, and optionally whether HARQ-ACK and/or CSI is included.

For a PUCCH resource Z, the following may be indicated to the MAC: the starting symbol and duration (the number of OFDM symbols in the PUCCH); and the UCI payload, including information about SR (e.g. SR resource IDs) conveyed in resource Z, and optionally whether HARQ-ACK and/or CSI is included.

For each physical layer priority, specific to the choice of {CG-Alt.1, SP-Alt.1}, the PHY may send an indication to the MAC concerning the selected PUSCH, which is DG PUSCH, including its starting symbol and duration. The corresponding physical layer priority of the selected PUSCH may also be indicated to the MAC including the starting symbol and duration of PUCCH and its UCI contents.

3.6 Stage 3

In Stage 3 shown in FIG. 3, the MAC applies logical channel prioritization (LCP), LCH-based prioritization, and dynamic skipping for DG PUSCH (if configured) and UL skipping for CG to generate a grant corresponding to a MAC PDU (which the MAC sends to the PHY in the form of a transport block). In certain embodiments, the MAC can override the request from PHY. For example, when the PHY indicates one DG (CG) PUSCH for UCI multiplexing, the MAC may generate one CG (DG) PUSCH instead of the indicated DG PUSCH.

At Stage 3, there may be various outcomes. In a first outcome of Stage 3, if the PUSCH selected for UCI multiplexing is with UL-SCH, the MAC generates MAC PDU for the PUSCH selected for UCI multiplexing. However, if the PUSCH selected for UCI multiplexing is without UL-SCH, the MAC does not generate MAC PDU for another PUSCH to overlap with the PUSCH selected for UCI multiplexing and the PHY transmits the PUSCH selected for UCI multiplexing (dropping SR if SR is present in resource Z).

In a second outcome of Stage 3, the PUSCH selected for UCI multiplexing in Stage 1 does not survive (e.g., the MAC generates MAC PDU for a PUSCH overlapping with the PUSCH selected in Stage 1). In this case, there can be two choices for the PHY. In a first choice, the PHY drops UCI. This choice is relatively simple from a UE implementation point of view, and it may be preferred if certain embodiments are extended to the cases with configured physical layer priority and/or lch-basedPrioritization.

In one embodiment when the PHY drops UCI, if the PUSCH selected for UCI multiplexing is with UL-SCH, the MAC does not generate MAC PDU for the PUSCH selected for UCI multiplexing. However, if the PUSCH selected for UCI multiplexing is without UL-SCH, the MAC generates MAC PDU for another PUSCH to overlap with the PUSCH selected for UCI multiplexing. The PHY then checks there is no PUSCH overlapping with resource Z on the PUCCH CC or another CC, and the PHY transmits resource Z including SR.

In another embodiment when the PHY drops UCI, if neither the PUSCH selected for UCI multiplexing nor resource Z can be used by the PHY (e.g., the MAC does not generate MAC PDU for the PUSCH selected for UCI multiplexing, but the MAC generates MAC PDU for a PUSCH overlapping with resource Z), then the PHY drops UCI.

In a second choice when the PUSCH selected for UCI multiplexing in Stage 1 does not survive, the PHY may re-run Step 2 in the clarification discussed above over actual PUSCH transmissions, for each physical layer priority to determine a PUSCH for UCI multiplexing. With this choice, the PHY runs Step 2 in the clarification over hypothetical PUSCH transmissions first in Stage 1, then reruns Step 2 in the clarification in Stage 3 over actual PUSCH transmissions that may include DG PUSCH, CG PUSCH, SP-CSI carrying PUSCHs. Thus, the second choice may be called a two-pass procedure and the implementation effort involved for the UE can be substantial.

With the two-pass procedure coming with the second choice, the initially selected PUSCH (from hypothetical PUSCH transmissions) may not be the ultimately selected PUSCH for UCI multiplexing (from actual PUSCH transmissions), which may defeat the original design purpose of keeping blind detection at the gNB low. However, in certain embodiments it may be incorrect to let the UCI multiplexing consideration dictate MAC behavior, i.e. to make the initially selected PUSCH be always transmitted/nonskippable, as the initial selection of PUSCH itself is made with limited information available at the PHY.

Thus, in certain embodiments, even for configured physical layer priority and/or lch-basedPriornization, when MAC PDU generation leads to the initially selected PUSCH for UCI multiplexing being dropped, the PHY drops UCI.

4.0 Example Embodiments for Stage 1 (CG-Alt. 2 and SP-Alt. 2)

In contrast to DG PUSCH, in certain embodiments rules are used to consider CG PUSCH occasions and SP-CSI PUSCHs. In the following examples, PUSCHs and PUCCH are assumed to be at the same numerology.

As discussed above with respect to (CG-Alt. 2, the PHY considers CG PUSCHs as hypothetical PUSCH transmissions in Stage 1 and uses rules to deal with CG/CG, CG/DG overlapping and potentially with different physical layer priorities. CG PUSCH occasions meeting a timeline condition (e.g., see section 9.2.5 of 3GPP TS 38.213) may be assumed to be a candidate for UCI multiplexing, if the CG PUSCH does not overlap with a DG PUSCH or a CG PUSCH candidate previously admitted as one of the hypothetical PUSCH transmissions. Further, with respect to SP-Alt. 2, PUSCHs configured by semiPersistentOnPUSCH are considered as hypothetical PUSCH transmissions in Stage 1. Since SP-CSI carrying PUSCH may be considered a low physical layer priority, for high physical layer priority PUSCHs configured by semiPersistentOnPUSCH are not included.

Figure 4:
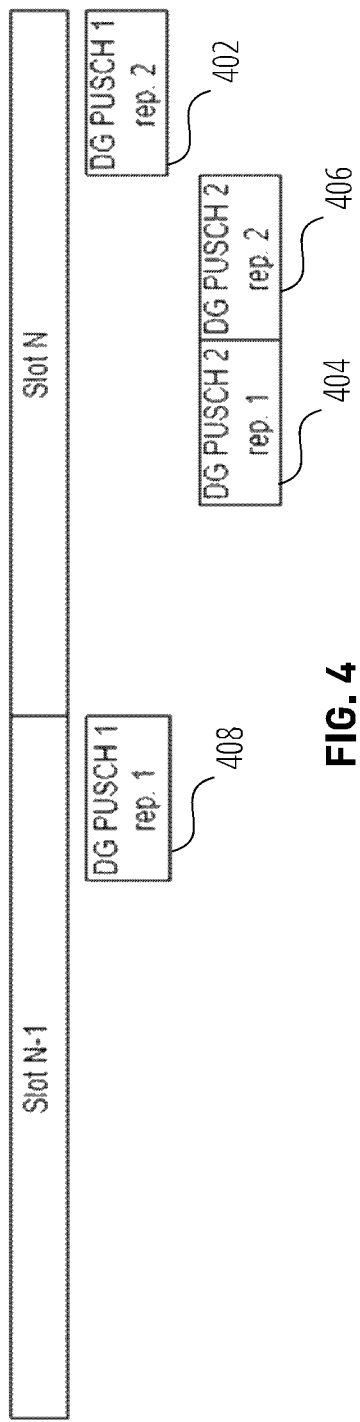
FIG. 4 is a block diagram illustrating candidate PUSCHs from DG PUSCHs according to certain embodiments.
Figure 5:
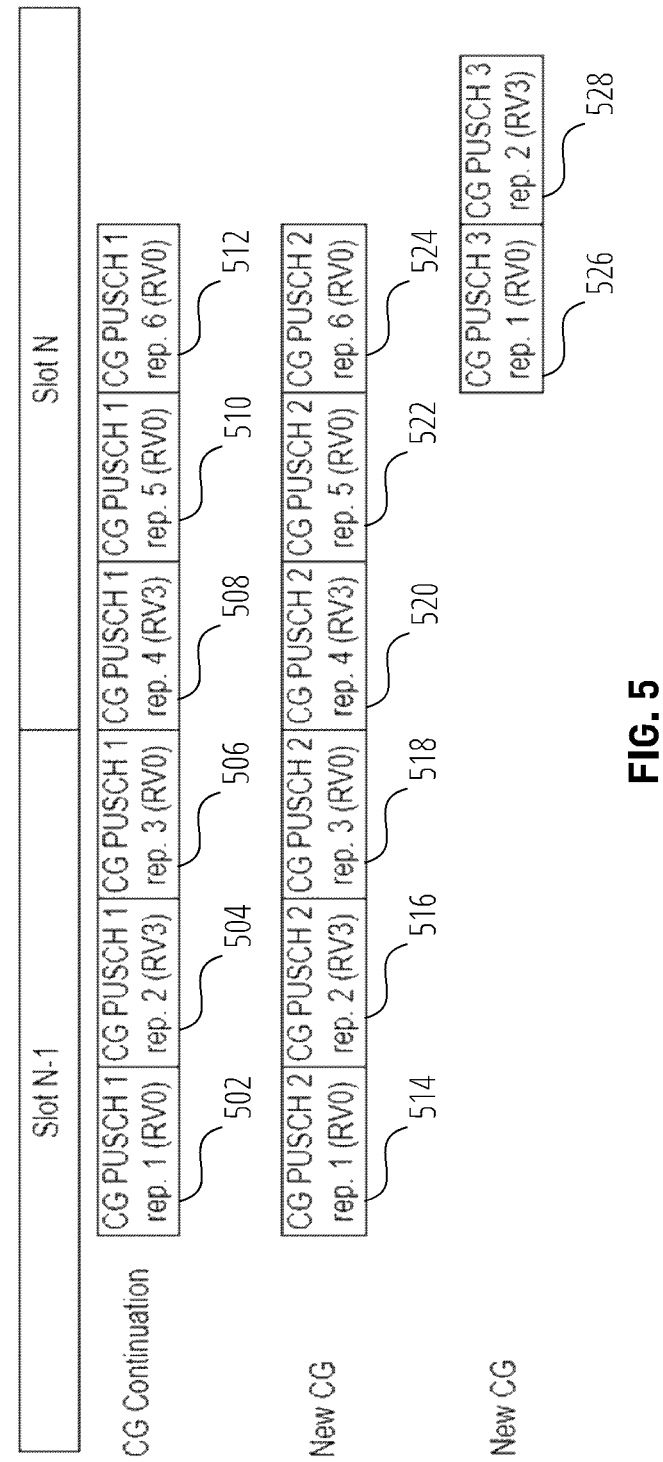
FIG. 5 is a block diagram illustrating candidate PUSCHs from CG PUSCHs/CG PUSCH transmission occasions according to certain embodiments.

At a high level, a candidate PUSCH in Slot N (the slot of interest) may be one of the PUSCHs shown in FIG. 4 or FIG. 5. Skilled persons will recognize from the disclosure herein that the configuration of the respective PUSCHs shown in FIG. 4 or FIG. 5 (e.g., repetition (rep.) number and/or redundancy version (RV)) are provided for illustrative purposes and are not limiting.

FIG. 4 is a block diagram illustrating candidate PUSCHs from DG PUSCHs according to certain embodiments. In Slot N of this example, DG PUSCH 402 (DG PUSCH 1 repetition (rep.) 2), DG PUSCH 404 (DG PUSCH 2 repetition 1), and DG PUSCH 406 (DG PUSCH 2 repetition 2) are eligible for UCI multiplexing. FIG. 4 also shows Slot N−1 with DG PUSCH 408 (DG PUSCH 1 repetition 1).

FIG. 5 is a block diagram illustrating candidate PUSCHs from CG PUSCHs/CG PUSCH transmission occasions according to certain embodiments. In this example, "CG continuation" PUSCHs in Slot N−1 and Slot N include a CG PUSCH occasion 502 (CG PUSCH 1 rep. 1 redundancy version 0 (RV0)), a CG PUSCH occasion 504 (CG PUSCH 1 rep. 2 (RV3)), a CG PUSCH occasion 506 (CG PUSCH 1 rep. 3 (RV0)), a CG PUSCH occasion 508 (CG PUSCH 1 rep. 4 (RV3)), a CG PUSCH occasion 510 (CG PUSCH 1 rep. 5 (RV0)), and a CG PUSCH occasion 512 (CG PUSCH 1 rep. 6 (RV0)). This example also includes a first group of "new CG" transmissions in Slot N−1 and Slot N corresponding to a CG PUSCH occasion 514 (CG PUSCH 2 rep. 1 (RV0)), a CG PUSCH occasion 516 (CG PUSCH 2 rep. 2 (RV3)), a CG PUSCH occasion 518 (CG PUSCH 2 rep. 3 (RV0)), a CG PUSCH occasion 520 (CG PUSCH 2 rep. 4 (RV3)), a CG PUSCH occasion 522 (CG PUSCH 2 rep. 5 (RV0)), and a CG PUSCH occasion 524 (CG PUSCH 2 rep. 6 (RV0)). This example further includes a second group of "new CG" transmissions in Slot N corresponding to a CG PUSCH occasion 526 (CG PUSCH 3 rep. 1 (RV0)), and a CG PUSCH occasion 528 (CG PUSCH 3 rep. 2 (RV3)).

For the illustrated "CG continuation" PUSCHs, a CG PUSCH occasion may be with a CG configuration with slot aggregation/PUSCH repetition type A/PUSCH repetition type B and at earlier CG transmissions of that CG configuration prior to Slot N (e.g., Slot N−1 or before), where a MAC PDU has already been generated by the MAC. Thus, it may be reasonable for the PHY to assume CG transmission(s) will continue in slot N. Due to time division duplex (TDD) configuration, and segmentation due to TDD/invalid symbols which results in orphan symbols, the earlier CG transmission prior to Slot N may take place in a slot not adjacent to slot N (e.g., Slot N−2, not shown). Hence, the PHY may use book keeping to decide CG continuation in slot N. Were such continued transmissions actual transmissions, any of the PUSCHs in Slot N would be eligible for UCI multiplexing. However, this is not the case for the new CG transmissions discussed in the embodiments below. In the example shown in FIG. 5, CG PUSCH occasion 508, CG PUSCH occasion 510, and CG PUSCH occasion 512 may be eligible for UCI multiplexing.

For the illustrated "new CG" transmissions, CG PUSCH occasion with a CG configuration, for which no MAC PDU has been generated yet, but CG PUSCH is allowed to start in Slot N. This includes several sub-cases including a CG configuration with a single CG PUSCH with redundancy version 0.

Another sub-case includes a CG PUSCH occasion with a CG configuration with slot aggregation/PUSCH repetition type A/PUSCH repetition type B, where there is at least one transmission occasion with redundancy version 0 in Slot N (denoted as $P_{cg,0}$). There is zero or more transmission occasions after $P_{cg,0}$ in slot N and they are collectively denoted as $P_{cg,k}$, $0 \leq k \leq K$, where there are K+1 transmission occasions in slot N. Had those transmission occasions been actual PUSCH transmissions, each of them would be eligible for UCI multiplexing. Considering that, with the intention to mimic the UE behavior over actual PUSCH transmissions for hypothetical transmissions in certain embodiments, the PHY may assume that any of them is eligible for UCI multiplexing (i.e., $P_{cg,k}$, $0 \leq k \leq K$ are all eligible for UCI multiplexing in certain embodiments). If among them, eventually $P_{cg,K'}$ is selected for UCI multiplexing, then the PHY generates indication for each of $P_{cg,k}$, $0 \leq k \leq K$, where $K' \leq K$. In such embodiments, the PHY generates an indication for $P_{cg,0}$ in order that the MAC generates MAC PDU for the configuration.

In addition, the PHY generates an indication for $P_{cg,k}$, $1 \leq k \leq K'$ so that the MAC does not de-prioritize subsequent transmissions with $P_{cg,k}$, $1 \leq k \leq K'$. Alternatively, if a later PUSCH in a slot aggregation/repetition Type A/repetition Type B bundle is selected for UCI multiplexing, then all the prior PUSCHs in the bundle are not de-prioritized, or the most recent PUSCH with redundancy version 0 prior to the selected PUSCH is not de-prioritized. Note that embodiments on multiple bit indication and their alternatives also applies to DG and CG continuation.

In one example where K=3, K'=2, the PHY generates indications for $P_{cg,k}$, $0 \le k \le 2$.

In the example shown in FIG. 5, CG PUSCH repetitions 5 and 6 (CG PUSCH occasion 522 and CG PUSCH occasion 524) are eligible for UCI multiplexing, but CG PUSCH repetition 4 (CG PUSCH occasion 520) is not eligible. Also in this example, CG PUSCH 3 repetitions 1 and 2 (CG PUSCH occasion 526 and CG PUSCH occasion 528) are eligible for UCI multiplexing. As CG PUSCH 2 repetition 6 (CG PUSCH occasion 524) overlaps with CG PUSCH 3 repetition 1 (CG PUSCH occasion 526), certain embodiments include rules to sort out overlapping CG PUSCHs.

In certain embodiments, SP-CSI PUSCH is eligible for UCI multiplexing, the PHY also considers SP-CSI PUSCH in Stage 1.

Then over each CC, the processing order (DG PUSCH>CG continuation>new CG transmission>SP-CSI PUSCH) is followed to derive non-overlapping PUSCHs/PUSCH occasions as hypothetical PUSCHs. A candidate admitted earlier for consideration on UCI multiplexing blocks any PUSCH overlapping with it.

In certain embodiments, SP-CSI PUSCH and CG PUSCH are of the same priority for UCI multiplexing (third priority). In such embodiments, additional options for the processing order can be used so SP-CSI PUSCHs are examined either ahead of or after the consideration of CG-PUSCH. For example, the processing order may be DG PUSCH>SP-CSI PUSCH>CG continuation>new CG transmission. As another example, the processing order may be DG PUSCH>CG continuation>SP-CSI PUSCH>new CG transmission.

Three options are discussed below for determining hypothetical PUSCH transmissions according to certain embodiments. Considering physical layer priority, if Stage 1 is executed independently for HP and LP, then Option 1 may be used. If Stage 1 is executed with dependence between HP and LP, then Option 2 and/or Option 3 can be used.

Figure 6:
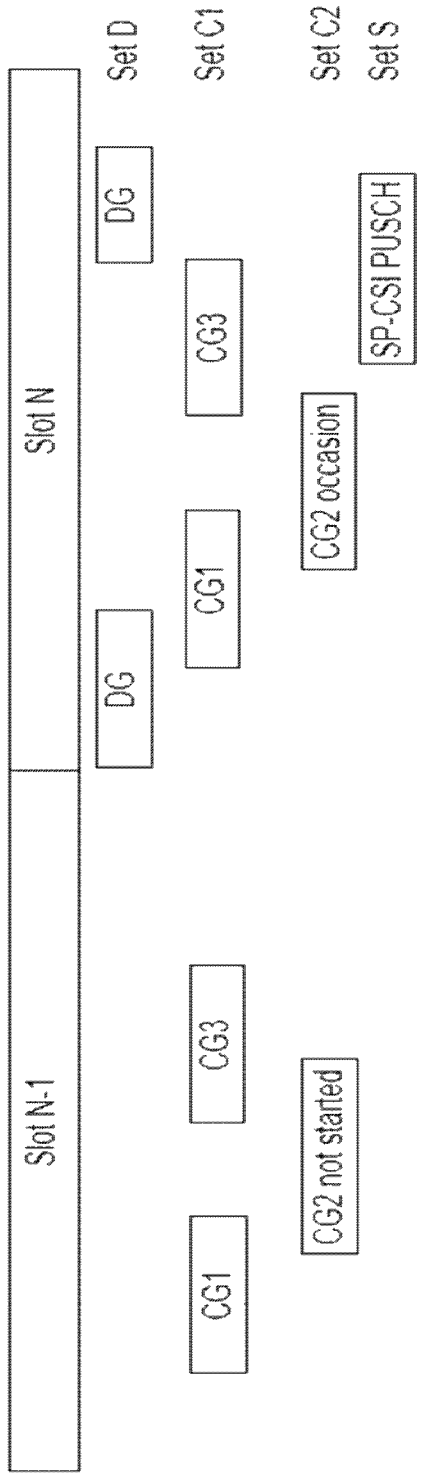
FIG. 6 is a block diagram illustrating PUSCHs categorized into different sets during a candidate admission process according to certain embodiments.

FIG. 6 is a block diagram illustrating PUSCHs categorized into different sets during a candidate admission process according to certain embodiments. As shown, a set D includes two DG PUSCHs in Slot N, a set C1 includes a CG1 PUSCH and a CG3 PUSCH in Slot N, set C2 includes a CG2 occasion in Slot N, and a set S includes a SP-CSI PUSCH in Slot N. For illustration, Slot N−1 includes CG1 and CG2 PUSCHs and an indication for "CG2 not started."

4.1 Option 1 for Determining Hypothetical PUSCH Transmissions

In option 1 for determining hypothetical PUSCH transmissions, at CC k, let B be the blocking orthogonal frequency division multiplexing (OFDM) symbols. For Option 1, B={ }. Run procedure "candidate admission" below with B.

For the candidate admission process, for all DG PUSCHs in slot N, a DG PUSCH in slot N does not overlap with OFDM symbols from set B, then the DG PUSCH is added to the set D.

For the candidate admission process, let C1 be the first set of examined CG PUSCHs be null, i.e. C1={ }, for continued transmissions from CG PUSCHs starting from slot N', N'<N. For a CG configuration with slot aggregation/PUSCH repetition type A or PUSCH repetition Type B, if the configuration's first actual transmission starts prior to slot N, all transmission occasions from that CG configuration in slot N if not in conflict with semi-static DL symbols or any symbols in set B or any symbol in set D or set C1 are included in C1. The checking on C1 starts with the lowest CG configuration index and goes on with higher CG configuration index.

For the candidate admission process, let C2 be the second set of examined PUSCHs be null, i.e. C2={ }, for new CG PUSCHs which can start in slot N. For a CG configuration with single slot transmission, slot aggregation/PUSCH repetition type A or PUSCH repetition Type B, if there is no actual transmission with the configuration prior to slot N, but the redundancy version configuration of the CG configuration allows the MAC to generate MAC PDU starting with a transmission in slot N and the PUSCH transmission is not in conflict with {semi-static DL symbols, any symbol in set B, any symbol in set D, symbols in Set C1, any symbol in Set C2}, then the earliest allowable transmission in slot N and subsequent transmission(s) if any are included in C2. For example, CG configuration 1 is with slot aggregation and redundancy version sequence [0 3 0 3], and slot "100" is with "0", slot "101" is with "3", slot "102" is with "0", slot "103" with "3". There is no actual transmission from slots "100" and "101", if N=102. Then the PHY considers that CG configuration 1 can commence a transmission in slot "102". The checking on C1 starts with the lowest CG configuration index and goes on with higher CG configuration index.

For the candidate admission process, a SP-CSI PUSCH on the CC is tested for its overlap with {semi-static DL symbols, any symbol in set B, any symbol in set D, symbols in Set C1, any symbol in Set C2}. If there is no overlap, then SP-CSI-PUSCH is admitted as a candidate in set S, otherwise the SP-CSI PUSCH is not included. The checking on S starts with the lowest CG configuration index and goes on with higher CG configuration index.

For the candidate admission process, the hypothetical PUSCHs at CC k is given by D ∪C1∪C2∪S. With hypothetical PUSCHs from all CCs, Step 2 from the clarification discussed above is executed to identify a PUSCH for UCI multiplexing, if any.

When the candidate admission process is executed independently for both physical layer priorities, timeline issues with Option 1 may not be so severe. However, it may happen that the selected LP PUSCH for UCI multiplexing may overlap with the selected HP PUSCH for UCI multiplexing, in which case the MAC may generate only a single MAC PDU.

4.2 Option 2 for Determining Hypothetical PUSCH Transmissions

Option 2 for determining hypothetical PUSCH transmissions includes, for CC k, run the above procedure "candidate admission" for HP PUSCHs with set B discussed below. The resulting sets are denoted as $D_H/C1_H/C2_H$. Choices for set B for this step include: Option 2-H1: B={ }; and Option 2-H2: B={the set of OFDM symbols occupied by DG LP PUSCHs in slot N}. In 3GPP Rel-16, SP-CSI PUSCH is of low priority, so the step in "candidate admission" procedure for SP-CSI PUSCH is omitted for the HP PUSCHs.

Then, for CC k, run the above procedure "candidate admission" for LP PUSCHs with set B discussed below. The resulting sets are denoted as $D_L/C1_L/C2_L/S$. Choices for set B for this step include: Option 2-L1: B={HP PUSCH if any selected for UCI multiplexing} ∪$D_H$ (note that HP PUSCH, if any, selected for UCI multiplexing can be from a CG PUSCH, which is not necessarily covered by set $D_H$);

Option 2-L2: B={HP PUSCH if any selected for UCI multiplexing} $\cup D_H \cup C1_H$, (besides HP DG, HP CG continuation can also block LP PUSCHs); and Option 2-L3: B={HP PUSCH if any selected for UCI multiplexing} $\cup D_H \cup C1_H \cup C2_H$.

Note with Option 2, as the "candidate admission" procedure for LP PUSCHs cannot start until the selection of PUSCH for HP UCI multiplexing finishes, a DCI scheduling HP DG PUSCH has to come at least X (X>=N2) symbols prior to the start of any LP PUSCH on any CC. In certain embodiments, a simpler requirement is that a DCI scheduling HP DG PUSCH has to come at least X (X>=N2) symbols prior to the start of slot N for Option 2.

4.3 Option 3 for Determining Hypothetical PUSCH Transmissions

Option 3 for determining hypothetical PUSCH transmissions further considers HP PUCCHs in selecting a LP PUSCH for UCI multiplexing, which creates even more timeline dependence between HP channels and LP channels.

For CC k, run the above procedure "candidate admission" for HP PUSCHs with set B discussed below. The resulting sets are denoted as $D_H/C1_H/C2_H$. Choices for set B for this step include: Option 2-H1: B={ }; and Option 2-H2: B={the set of OFDM symbols occupied by DG LP PUSCHs in slot N}. In 3GPP Rel-16, SP-CSI PUSCH is of low priority, so the step in "candidate admission" procedure for SP-CSI PUSCH is omitted for the HP PUSCHs.

Then, for CC k, run the above procedure "candidate admission" for LP PUSCHs with set B discussed below. The resulting sets are denoted as $D_L/C1_L/C2_L/S$. Choices for set B for this step include: Option 2-L1: B={HP PUSCH if any selected for UCI multiplexing, and HP PUCCHs} $\cup D_H$ (note that HP PUSCH, if any, selected for UCI multiplexing can be from a CG PUSCH, which is not covered by set $D_H$); Option 2-L2: B={HP PUSCH if any selected for UCI multiplexing, and HP PUCCHs} $\cup D_H \cup C1_H$, (besides HP DG, HP CG continuation can also block LP PUSCH); and Option 2-L3: B={HP PUSCH if any selected for UCI multiplexing, and HP PUCCHs} $\cup D_H \cup C1_H \cup C2_H$.

5.0 Example UCI Multiplexing with Actual SR Indications from MAC

SR has a dual identity, one as PUCCH and another as a subject for LCH based prioritization. When LCH based prioritization is configured, if SR is present in UCI in resource Z, and further if the SR is a positive SR and of a higher LCH priority than PUSCH, then a colliding PUSCH should be dropped. If the SR is a negative SR, then the MAC PDU should be generated by the MAC for the colliding PUSCH so UCI multiplexing over that PUSCH can be conducted. If the UE PHY is not aware of the status of SR in resource Z, then generation of the PHY indication for UCI multiplexing becomes problematic.

In certain systems, when SR collides with PUSCH with data, SR is dropped. Thus, either the UE PHY should make the assumption that the SRs in the resource Z are negative and generates an indication, or LCH based prioritization is configured so the SR/PUSCH in 3GPP Rel-15 with data handling can be used.

In certain embodiments discussed above, either a fixed status (e.g., all SRs involved in UCI multiplexing are negative SRs) is assumed, or the question on SR status is avoided by eliminating collision of PUCCHs at PUCCH Format 1 for SR and HARQ-ACK. In other embodiments, however, to avoid discrepancies between a PHY assumption (that all involved SRs are negative) and SR's actual status, the PHY uses actual SR indications from the MAC for Stage 1.

Figure 7:
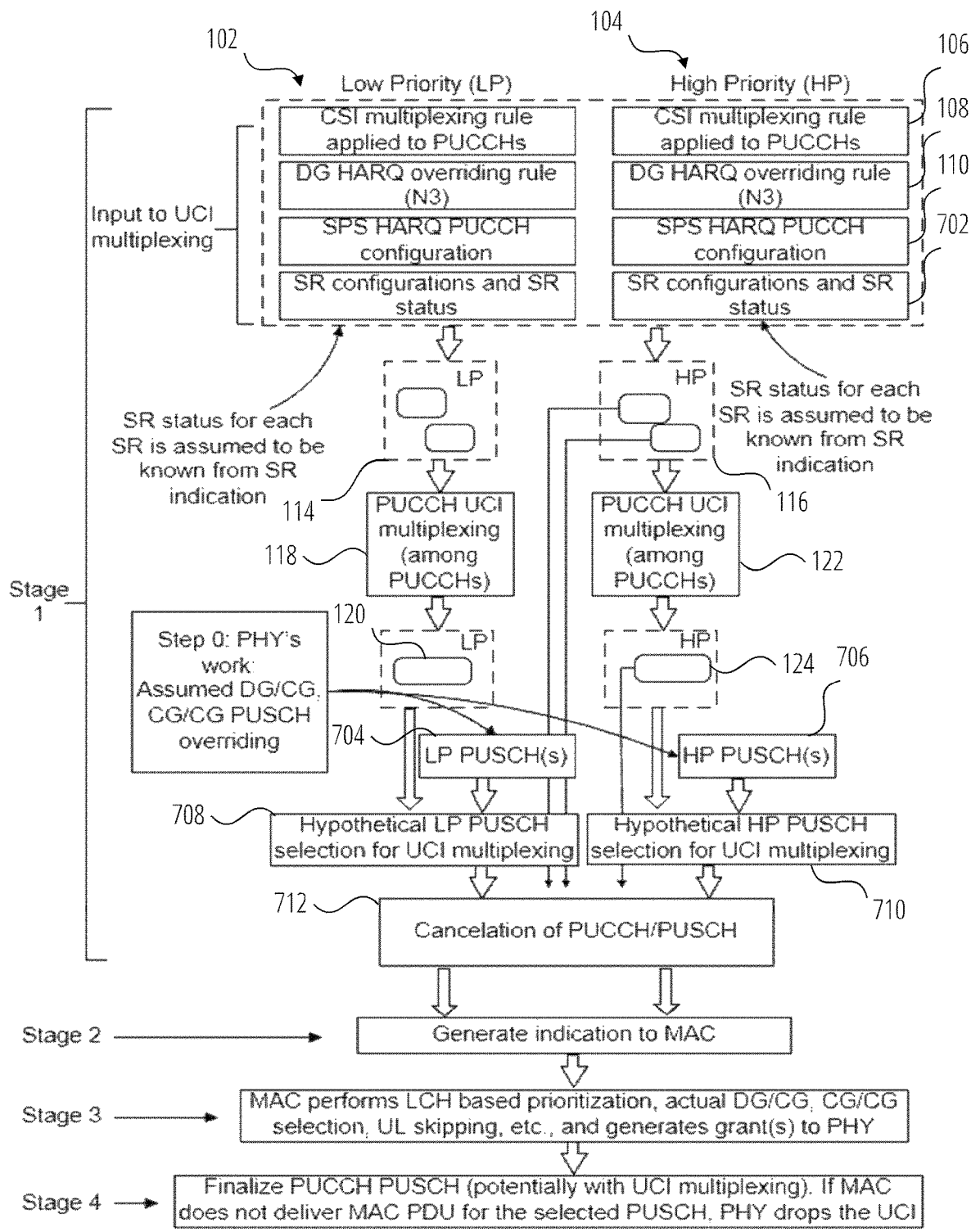
FIG. 7 is a block diagram illustrating UCI multiplexing with actual SR indications from the MAC according to certain embodiments.

For example, FIG. 7 is a block diagram illustrating UCI multiplexing with actual SR indications from the MAC according to certain embodiments. Similar to the example shown in FIG. 3, the UCI multiplexing shown in FIG. 7 includes separate sub-processes for LP processing 102 and HP processing 104. The example shown in FIG. 7 also includes the inputs to UCI multiplexing (process 106, process 108, and process 110), the LP channels 114 and HP channels 116 with overlapping PUCCH resources, and the PUCCH UCI multiplexing (process 118 and process 122) to generate the LP PUCCH resource Z 120 and/or the HP PUCCH resource Z 124 shown in FIG. 1. However, in the example shown in FIG. 7, at a process 702 the UE's PHY assumes that SR status is known for each SR based on SR indication from the MAC.

In one such embodiment, at Stage 1 shown in FIG. 7, the UE PHY receives positive SR indications, if any, from the MAC. For example, the MAC may send an "early" SR status (e.g., after a scheduling request is triggered) indicating the MAC's intention to send a positive SR. Note, however, that the actual instruction to signal SR (or PUSCH) happens only later, after the MAC has been provided with the PUCCH resource Z in return and the selected transmission has been triggered from the MAC to the PHY. The PHY performs a process 708 for hypothetical LP PUSCH selection for UCI multiplexing among the LP PUCCH resource Z 120 and other LP PUSCH(s) 704. The PHY also performs a process 710 for hypothetical HP PUSCH selection for UCI multiplexing among the HP PUCCH resource Z 124 and other HP PUSCH(s) 706. With the received positive SR indications, the PHY performs a process 712 for cancelation of PUCCH/PUSCH, wherein the PHY does not need to make any assumption on the status of SR, as SR status from the MAC is available to PHY. Thus, the channel selection issue discussed above for PUCCH format 1 and in general the uncertainty in SR status is avoided from a UE processing's point of view (gNB may still needs to deal with uncertainty in UCI multiplexing). Note in this case, besides SR status, the UE PHY may not need to know anything about UL skipping, DG/CG prioritization as a precondition.

At Stage 2 shown in FIG. 7, the PHY indicates to the MAC a target PUSCH selected by the PHY for UCI multiplexing. The PHY also indicates PUCCH resource Z (starting symbol and duration of PUCCH) and UCI contents of PUCCH resource Z (SR with SR resource ID(s), HARQ, CSI) to the MAC.

At Stage 3 shown in FIG. 7, the MAC performs LCH based prioritization, actual DG/CG, CG/CG selection, UL skipping, etc., and generates grant(s) (corresponding to (MAC PDU(s)) to the PHY. The MAC PDU( ) arrive to the PHY in the form of a transport blocks. With resource Z found, and the UE PHY having generated an indication to the MAC for the target PUSCH with UCI multiplexing, and the indication indicating the involved SRs in resource Z, the MAC has the choice to generate the MAC PDU for the PUSCH. Note that data-vs-data as well as SR-vs-data LCH based prioritization can be performed by the MAC. Through the generation of MAC PDU(s) or an instruction to the PHY to signal SR, the MAC can control whether PUSCH or SR is transmitted.

At Stage 4 shown in FIG. 7, if the MAC PDU for a PUSCH is generated, or the PUSCH with UCI multiplexing (as expected by PHY) is not deprioritized or dropped (e.g., SP CSI PUSCH with UCI does not need MAC PDU generation but it can be dropped due to an overlapping PUSCH with UL-SCH if MAC generates MAC PDU for the overlapping PUSCH) from the MAC due to MAC PDU(s)

generation, the UE PHY multiplexes the UCIs in resources except SR(s) are multiplexed over the PUSCH. If the MAC PDU(s) are not generated, then the UE PHY proceeds to transmit PUCCH resource Z.

The UCI multiplexing shown in FIG. 7 may have various example outcomes, according to certain embodiments. In a first outcome, if the PUSCH selected for UCI multiplexing is with UL-SCH, the MAC generates MAC PDU for the PUSCH selected for UCI multiplexing. Alternatively, if the PUSCH selected for UCI multiplexing is without UL-SCH, the MAC does not generate MAC PDU for another PUSCH to overlap with the PUSCH selected for UCI multiplexing, and the PHY transmits the PUSCH selected for UCI multiplexing (dropping SR if SR is present in resource Z).

In a second outcome, if the PUSCH selected for UCI multiplexing is with UL-SCH, the MAC does not generate MAC PDU for the PUSCH selected for UCI multiplexing. Then, the PHY checks there is no PUSCH overlapping with resource Z on the PUCCH CC or another CC, and the PHY transmits resource Z including SR. Alternatively, if the PUSCH selected for UCI multiplexing is without UL-SCH, the MAC generates MAC PDU for another PUSCH to overlap with the PUSCH selected for UCI multiplexing. Then, the PHY checks there is no PUSCH overlapping with resource Z on the PUCCH CC or another CC, and the PHY transmits resource Z including SR.

In a third outcome, if neither the PUSCH selected for UCI multiplexing nor resource Z can be used by the PHY (e.g., the MAC does not generate MAC PDU for the PUSCH selected for UCI multiplexing, but MAC generates MAC PDU for a PUSCH overlapping with resource Z), then the PHY drops UCI.

6.0 Additional Solutions of UCI Multiplexing PUSCH Skipping

In certain embodiments discussed above (e.g., in relation to FIG. 3 and FIG. 7), the PHY executes the UCI multiplexing from identifying PUCCH resource Z to identifying PUSCH for UCI multiplexing. In another embodiment, PHY processing may be divided into two segments: a first segment to identify PUCCH resource Z; and a second segment that uses the grants from the MAC, if any, to identify the PUSCH for UCI multiplexing.

Figure 8:
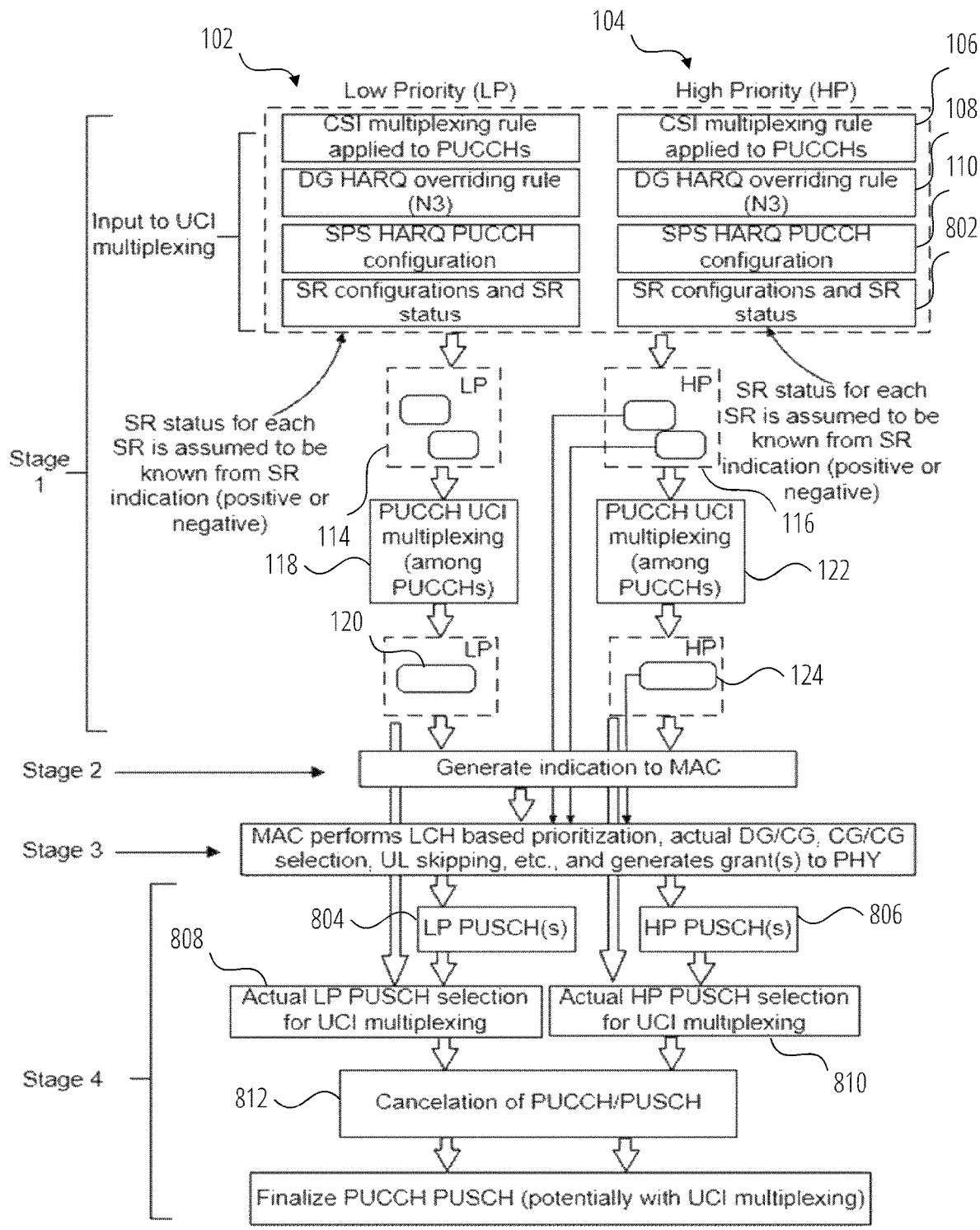
FIG. 8 is a block diagram illustrating UCI multiplexing according to certain embodiments.

For example, FIG. 8 is a block diagram illustrating UCI multiplexing according to certain embodiments. Similar to the example shown in FIG. 3, the UCI multiplexing shown in FIG. 8 includes separate sub-processes for LP processing 102 and HP processing 104. The example shown in FIG. 8 also includes the inputs to UCI multiplexing (process 106, process 108, and process 110), the LP channels 114 and HP channels 116 with overlapping PUCCH resources, and the PUCCH UCI multiplexing (process 118 and process 122) to generate the LP PUCCH resource Z 120 and/or the HP PUCCH resource Z 124 shown in FIG. 1. However, in the example shown in FIG. 8, at a process 802 the UE's PHY, SR status for each SR is assumed to be known from SR indication (positive or negative).

In Stage 2 shown in FIG. 8, the PHY generates indication to the MAC which includes information about PUCCH resource Z and its contents. Optionally, the indication also includes information about PUSCHs without UL-SCH (SP-CSI PUSCH or AP-CSI only over PUSCH).

In Stage 3 shown in FIG. 8, the MAC performs LCH based prioritization, actual DG/CG, CG/CG selection, UL skipping, etc., and generates grant(s) to the PHY using whatever decision the MAC deems appropriate. MAC PDU (s) arrives to the PHY in the form of a transport blocks.

In Stage 4 shown in FIG. 8, the PHY takes the actual grants from the MAC, and selects a PUSCH for UCI multiplexing, if any. In particular, The PHY performs a process 808 for actual LP PUSCH selection for UCI multiplexing among the LP PUCCH resource Z 120 and other LP PUSCH(s) 804. The PHY also performs a process 810 for actual HP PUSCH selection for UCI multiplexing among the HP PUCCH resource Z 124 and other HP PUSCH(s) 806. The PHY then performs a process 812 for cancelation of PUCCH/PUSCH before finalizing PUCCH PUSCH (potentially with UCI multiplexing).

Figure 9:
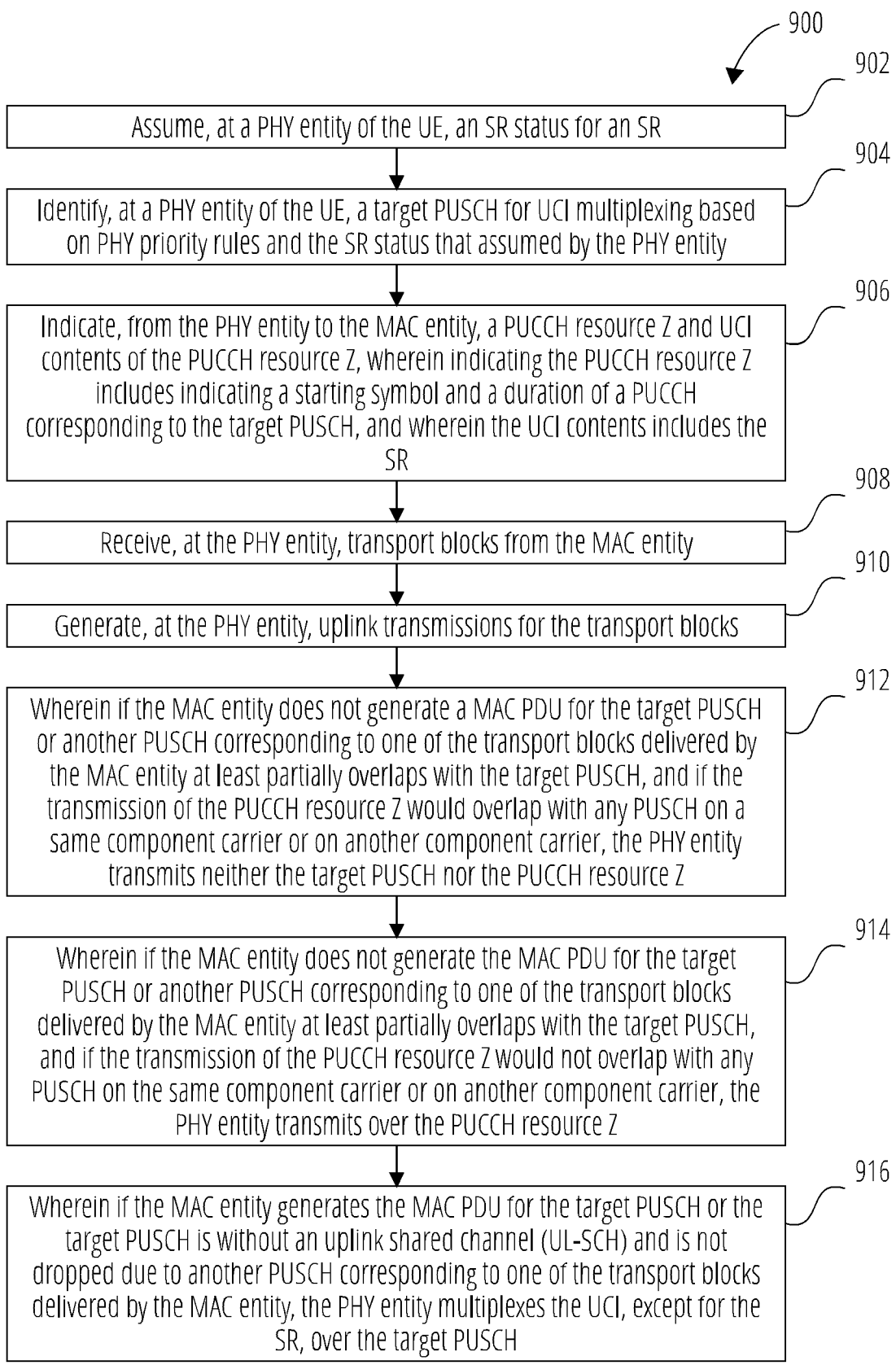
FIG. 9 is a flowchart illustrating a method in accordance with one embodiment.

FIG. 9 is a flowchart of a method 900 for a user equipment (UE) to perform uplink control information (UCI) multiplexing with physical layer (PHY) priority and logical channel (LCH) based prioritization according to one embodiment. The method 900 may be performed, for example, by the UE 1102 shown in FIG. 11A and FIG. 11B. In block 902, the method 900 includes assuming, at a PHY entity of the UE, a scheduling request (SR) status for a SR. In block 904, the method 900 includes identifying, at the PHY entity of the UE, a target physical uplink shared channel (PUSCH) for UCI multiplexing based on PHY priority rules and the SR status that assumed by the PHY entity. In block 906, the method 900 indicating, from the PHY entity to the MAC entity, a physical uplink control channel (PUCCH) resource Z and UCI contents of the PUCCH resource Z, wherein indicating the PUCCH resource Z includes indicating a starting symbol and a duration of a PUCCH corresponding to the target PUSCH, and wherein the UCI contents includes the SR. In block 908, the method 900 includes receiving, at the PHY entity, transport blocks from the MAC entity. In block 910, the method 900 includes generating, at the PHY entity, uplink transmissions for the transport blocks.

In block 912, the method 900 further includes, wherein if the MAC entity does not generate a MAC protocol data unit (PDU) for the target PUSCH or another PUSCH corresponding to one of the transport blocks delivered by the MAC entity at least partially overlaps with the target PUSCH, and if the transmission of the PUCCH resource Z would overlap with any PUSCH on a same component carrier or on another component carrier, the PHY entity transmits neither the target PUSCH nor the PUCCH resource Z.

In block 914, the method 900 further includes, wherein if the MAC entity does not generate the MAC PDU for the target PUSCH or another PUSCH corresponding to one of the transport blocks delivered by the MAC entity at least partially overlaps with the target PUSCH, and if the transmission of the PUCCH resource Z would not overlap with any PUSCH on the same component carrier or on another component carrier, the PHY entity transmits over the PUCCH resource Z.

In block 916, method 900 wherein if the MAC entity generates the MAC PDU for the target PUSCH or the target PUSCH is without an uplink shared channel (UL-SCH) and is not dropped due to another PUSCH corresponding to one of the transport blocks delivered by the MAC entity, the PHY entity multiplexes the UCI, except for the SR, over the target PUSCH.

In certain embodiments of the method 900, identifying, at the PHY entity, the target PUSCH for UCI multiplexing is further based on at least one of channel state information (CSI) and a hybrid automatic repeat request-acknowledgement (HARQ-ACK). Certain such embodiments further include selecting, at the PHY entity, the target PUSCH for UCI multiplexing to avoid overlapping of a HARQ-ACK PUCCH resource using a PUCCH format 1 and an SR PUCCH resource using the PUCCH format 1.

In certain embodiments of the method 900, the UCI contents further include at least one of hybrid automatic repeat request-acknowledgement (HARD) feedback and channel state information (CSI).

In certain embodiments of the method 900, the UCI contents further include one or more SR resource identifier (ID) of one or more SR included in the PUCCH resource Z.

Certain embodiments of the method 900 further include selecting, by the PHY entity, a dynamic grant (DG) PUSCH as a candidate for the target PUSCH for UCI multiplexing.

Certain embodiments of the method 900 further include not selecting, by the PHY entity, configured grant (CG) PUSCHs as candidates for the target PUSCH for UCI multiplexing.

Certain embodiments of the method 900 further include not selecting, by the PHY entity, semi-persistent channel state information (SP-CSI) PUSCHs as candidates for the target PUSCH for UCI multiplexing.

Certain embodiments of the method 900 further include selecting, by the PHY entity, configured grant (CG) PUSCHs as candidates for the target PUSCH for UCI multiplexing.

Certain embodiments of the method 900 further include selecting, by the PHY entity, a CG PUSCH occasion as one of the candidates for the target PUSCH when the CG PUSCH occasion does not overlap with a dynamic grant (DG) PUSCH candidate or a CG PUSCH candidate previously admitted to a set of hypothetical PUSCH transmissions. Certain such embodiments may include selecting, by the PHY entity, semi-persistent channel state information (SP-CSI) PUSCH as one of possible candidates for the target PUSCH for UCI multiplexing when the PHY entity assumes that an overlapping SR is negative and when the SP-CSI PUSCH does not overlap with a previously admitted DG PUSCH or a previously admitted CG PUSCH. The method 900 may further include for each component carrier (CC), following a processing order to derive non-overlapping PUSCHs or PUSCH occasions in a slot to admit to the set of hypothetical PUSCH transmissions, wherein a candidate admitted earlier to the set of hypothetical PUSCH transmissions blocks a later overlapping PUSCH or later overlapping PUSCH occasion in the slot from being admitted to the set of hypothetical PUSCH transmissions. The processing order may comprise processing dynamic grant (DG) PUSCHs, followed by CG PUSCH occasions with a CG configuration with slot aggregation or PUSCH repetition continuing from a previous slot (CG continuations), followed by new CG PUSCH occasions configured to start in the slot (new CG transmissions), and followed by the SP-CSI PUSCHs. Alternatively, the processing order may comprise processing dynamic grant (DG) PUSCHs, followed by the SP-CSI PUSCHs, followed by CG PUSCH occasions with a CG configuration with slot aggregation or PUSCH repetition continuing from a previous slot (CG continuations), and followed by new CG PUSCH occasions configured to start in the slot (new CG transmissions). Alternatively, the processing order may comprise processing dynamic grant (DG) PUSCHs, followed by CG PUSCH occasions with a CG configuration with slot aggregation or PUSCH repetition continuing from a previous slot (CG continuations), followed by the SP-CSI PUSCHs, and followed by new CG PUSCH occasions configured to start in the slot (new CG transmissions).

In certain embodiments of the method 900, the PHY entity independently derives, for high priority (HP) physical layer priority and low priority (LP) physical layer priority, the non-overlapping PUSCHs or PUSCH occasions in the slot to admit to the set of hypothetical PUSCH transmissions. When a selected LP PUSCH for UCI multiplexing overlaps with a selected HP PUSCH for UCI multiplexing, the MAC entity may generate a single corresponding MAC PDU.

In certain embodiments of the method 900, the PHY entity derives the non-overlapping PUSCHs or PUSCH occasions in the slot to admit to the set of hypothetical PUSCH transmissions with a dependence between high priority (HP) physical layer priority and low priority (LP) physical layer priority, and wherein the PHY entity does not consider LP PUSCHs until selection of HP PUSCHs for admitting to the set of hypothetical PUSCH transmissions is complete.

In certain embodiments of the method 900, the PHY entity derives the non-overlapping PUSCHs or PUSCH occasions in the slot to admit to the set of hypothetical PUSCH transmissions with a dependence between high priority (HP) physical layer priority and low priority (LP) physical layer priority, and wherein the PHY entity considers HP PUSCHs in selecting a LP PUSCH to admit to the set of hypothetical PUSCH transmissions.

Figure 10:
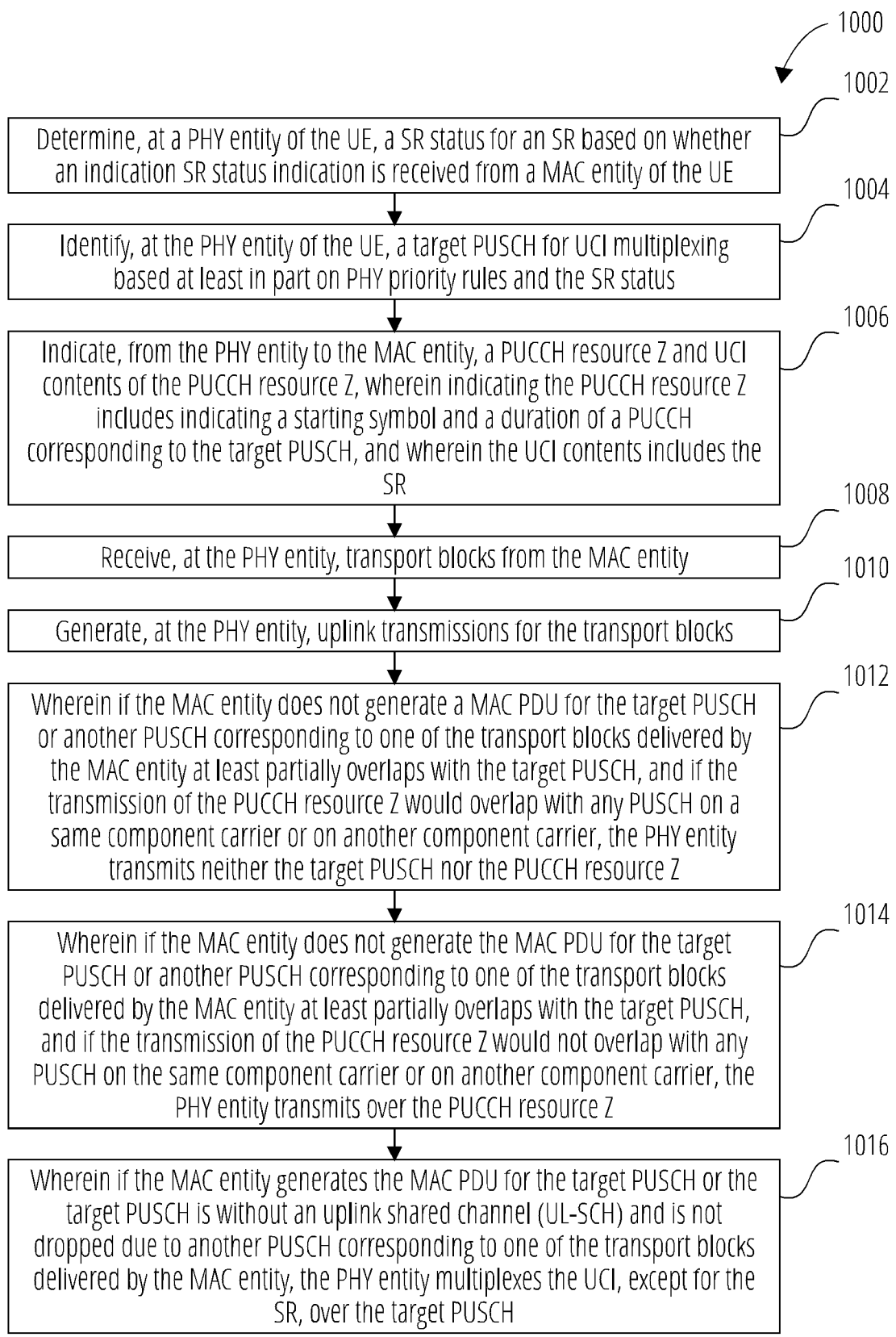
FIG. 10 is a flowchart illustrating a method in accordance with one embodiment.

FIG. 10 is a flowchart of a method 1000 for a user equipment (UE) to perform uplink control information (UCI) multiplexing with physical layer (PHY) priority and logical channel (LCH) based prioritization according to one embodiment. The method 1000 may be performed, for example, by the UE 1102 shown in FIG. 11A and FIG. 11B. In block 1002, the method 1000 including determining, at a PHY entity of the UE, a scheduling request (SR) status for an SR based on whether an indication SR status indication is received from a media access control (MAC) entity of the UE. In block 1004, the method 1000 includes identifying, at the PHY entity of the UE, a target physical uplink shared channel (PUSCH) for UCI multiplexing based at least in part on PHY priority rules and the SR status. In block 1006, the method 1000 includes indicating, from the PHY entity to the MAC entity, a physical uplink control channel (PUCCH) resource Z and UCI contents of the PUCCH resource Z, wherein indicating the PUCCH resource Z includes indicating a starting symbol and a duration of a PUCCH corresponding to the target PUSCH, and wherein the UCI contents includes the SR. In block 1008, the method 1000 includes receiving, at the PHY entity, transport blocks from the MAC entity. In block 1010, the method 1000 includes generating, at the PHY entity, uplink transmissions for the transport blocks.

In block 1012, the method 1000 further includes, wherein if the MAC entity does not generate a MAC PDU for the target PUSCH or another PUSCH corresponding to one of the transport blocks delivered by the MAC entity at least partially overlaps with the target PUSCH, and if the transmission of the PUCCH resource Z would overlap with any PUSCH on a same component carrier or on another component carrier, the PHY entity transmits neither the target PUSCH nor the PUCCH resource Z.

In block 1014, the method 1000 further includes, wherein if the MAC entity does not generate the MAC PDU for the target PUSCH or another PUSCH corresponding to one of the transport blocks delivered by the MAC entity at least partially overlaps with the target PUSCH, and if the transmission of the PUCCH resource Z would not overlap with any PUSCH on the same component carrier or on another component carrier, the PHY entity transmits over the PUCCH resource Z.

In block 1016, the method 1000 further includes, wherein if the MAC entity generates the MAC PDU for the target PUSCH or the target PUSCH is without an uplink shared channel (UL-SCH) and is not dropped due to another PUSCH corresponding to one of the transport blocks delivered by the MAC entity, the PHY entity multiplexes the UCI, except for the SR, over the target PUSCH.

In certain embodiments of the method 1000, determining the SR status comprises: determining, at the MAC entity, whether to provide the SR status indication for the SR to a PHY entity of the UE; if the MAC entity provides the SR status indication, determining, at the PHY entity, that the SR status is positive for the SR; and if the MAC entity does not provide the SR status indication, assuming, at the PHY entity, that the SR status is negative for the SR.

In certain embodiments of the method 1000, identifying, at the PHY entity, the target PUSCH for UCI multiplexing is further based on at least one of channel state information (CSI) and a hybrid automatic repeat request-acknowledgement (HARQ-ACK).

In certain embodiments of the method 1000, the UCI contents further include at least one of hybrid automatic repeat request-acknowledgement (HARD) feedback and channel state information (CSI).

In certain embodiments of the method 1000, the UCI contents further include one or more SR resource identifier (ID) of one or more SR included in the PUCCH resource Z.

Certain embodiments of the method 1000 further include, in response to an indication from the PHY entity of the PUCCH resource Z and the UCI contents of the PUCCH resource Z: if the SR status is positive and the SR is associated with a higher LCH priority than an LCH priority associated with the PUSCH, then the MAC entity drops a colliding PUSCH; if the SR status is positive and the SR is associated with a lower LCH priority than the LCH priority associated with the PUSCH, then the MAC entity drops a colliding SR; and if the SR is a negative, then the MAC entity generates the MAC PDU for the colliding PUSCH for UCI multiplexing over the colliding PUSCH by the PHY entity.

In a communication standard of a wireless communication system, the specification is generally defined as a protocol stack (which can also be called hierarchical protocol) in which a wireless communication function is divided into a series of layers. For example, a physical layer is defined as a first layer, a data link layer is defined as a second layer, and a network layer is defined as a third layer. In the fourth generation mobile communication system (which can also be called 4G system) such as LTE, the second layer is divided into a plurality of sublayers, and includes a first sub-layer (packet data convergence protocol (PDCP) layer), a second sub-layer (radio link control (RLC) layer) and a third sub-layer (medium access control (MAC) layer). Furthermore, in the 4G system, the first layer may be called physical (PHY) layer. Furthermore, the third layer may include a radio resource control (RRC) layer. [0005] Each layer in a transmission device of a wireless communication system performs processing compliant with a predetermined protocol such as adding a header to a data block (which can also be called service data unit (SDU)) from an upper layer to generate a protocol data unit (PDU) that is an information unit exchanged between peer processes in a reception device, and transfers the PDU to a lower layer. For example, in the RLC layer in LTE, a PDCP-PDU that is a data block from the PDCP layer as an upper layer is received as an RLC-SDU, and an RLC-PDU is generated by connecting a plurality of RLC-SDUs within a transport block (TB) length notified from a lower layer, or the like. Such an RLC-PDU is transferred to the MAC layer as a lower layer in a state where an RLC header having a sequence number (SN) in the RLC layer is added. [006] Each layer in the reception device of the wireless communication system receives a data block (which can also be called PDU) from a lower layer, and transfers a data block (which can also be called SDU), which is taken by removing a header and the like, to an upper layer. For example, in the RLC layer in LTE, processing such as reassembly of a plurality of RLC-PDUs stored in one RLC-PDU is performed by referring to the RLC header attached to the data block (which can also be called MAC-SDU or RLC-PDU) from the MAC layer as a lower layer, and RLC-SDU is transferred to the PDCP layer as an upper layer. At that time, to compensate the order of RLC-SDU for the upper layer, in-order processing based on an RLC sequence number included in the RLC header is performed in the reassembly of the RLC-SDU. Then, in a case where missing of the RLC sequence number is detected, RLC retransmission control for requesting the retransmission of RLC-PDU to the transmission device is executed. It is being discussed that the 5G system also basically follows the above-described protocol stack in the 4G system.

Figure 11A:
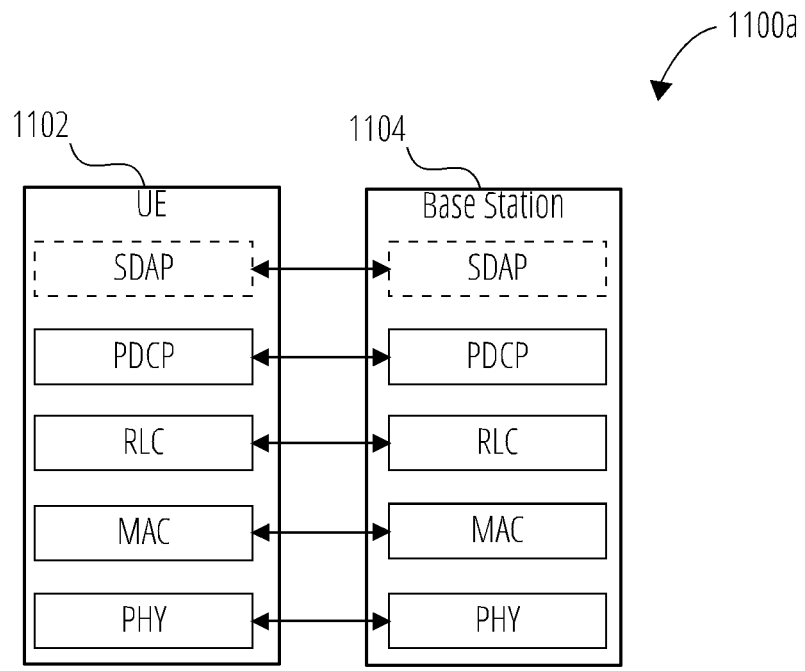
FIG. 11A and FIG. 11B illustrate examples of protocol stacks in a 3GPP based wireless communication system.
Figure 11B:
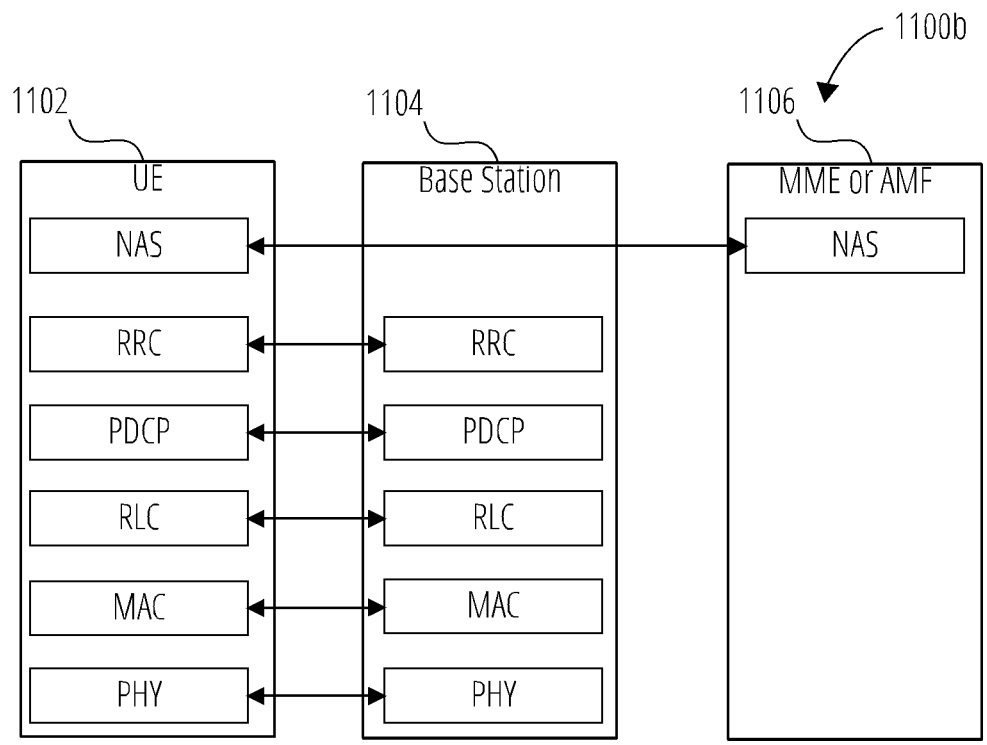

FIG. 11A and FIG. 11B illustrate examples of protocol stacks in a 3GPP based wireless communication system. As used herein, an illustrated layer of a protocol stack may also be referred as entity (or simply by the name of the layer). For example, the PHY layer may be referred to as a PHY entity (or simply as a PHY) and the MAC layer may be referred to as a MAC entity (or simply as a MAC).

FIG. 11A illustrates an example of a radio interface user plane protocol stack 1100*a* between a UE 1102 and a base station 1104 and FIG. 11B illustrates an example of a control plane protocol stack 1100*b* between the UE 1102, the base station 1104, and a core network 1106 (i.e., a media access control (MME) in LTE or an access and mobility management function (AMF) in NR). The UE 1102, base station 1104, and/or portions of the core network 1106 may be implemented using, for example, the components 1200 shown in FIG. 12.

The control plane refers to a path through which control messages used to manage call by a UE and a network are transported. The user plane refers to a path through which data generated in an application layer, for example, voice data or Internet packet data are transported. Referring to FIG. 11A, the user plane protocol stack may be divided into a first layer (Layer 1) (i.e., a PHY layer) and a second layer (Layer 2). Referring to FIG. 11B, the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS). As used herein, the illustrated layers may also be referred as entities. For example, the PHY layer may be referred to as a PHY entity and the MAC layer may be referred to as a MAC entity.

In the 3GPP LTE systems, the Layer 2 is split into the following sublayers: MAC, RLC, and Packet Data Convergence Protocol (PDCP). In the 3GPP New Radio (NR) system, the Layer 2 is split into the following sublayers: MAC, RLC, PDCP and Service Data Adaptation Protocol (SDAP). The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network QoS flows.

In the 3GPP NR system, example services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, example services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of Signaling Radio Bearers (SRBs) and Data Radio Bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, example services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The example services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, example services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, example services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing PWS broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist: CCCH can be mapped to uplink shared channel (UL-SCH); DCCH can be mapped to UL-SCH; and DTCH can be mapped to UL-SCH.

The MAC PDU arrives to the PHY layer in the form of a transport block. In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a base station via a PDSCH based on a DL assignment.

Figure 12:
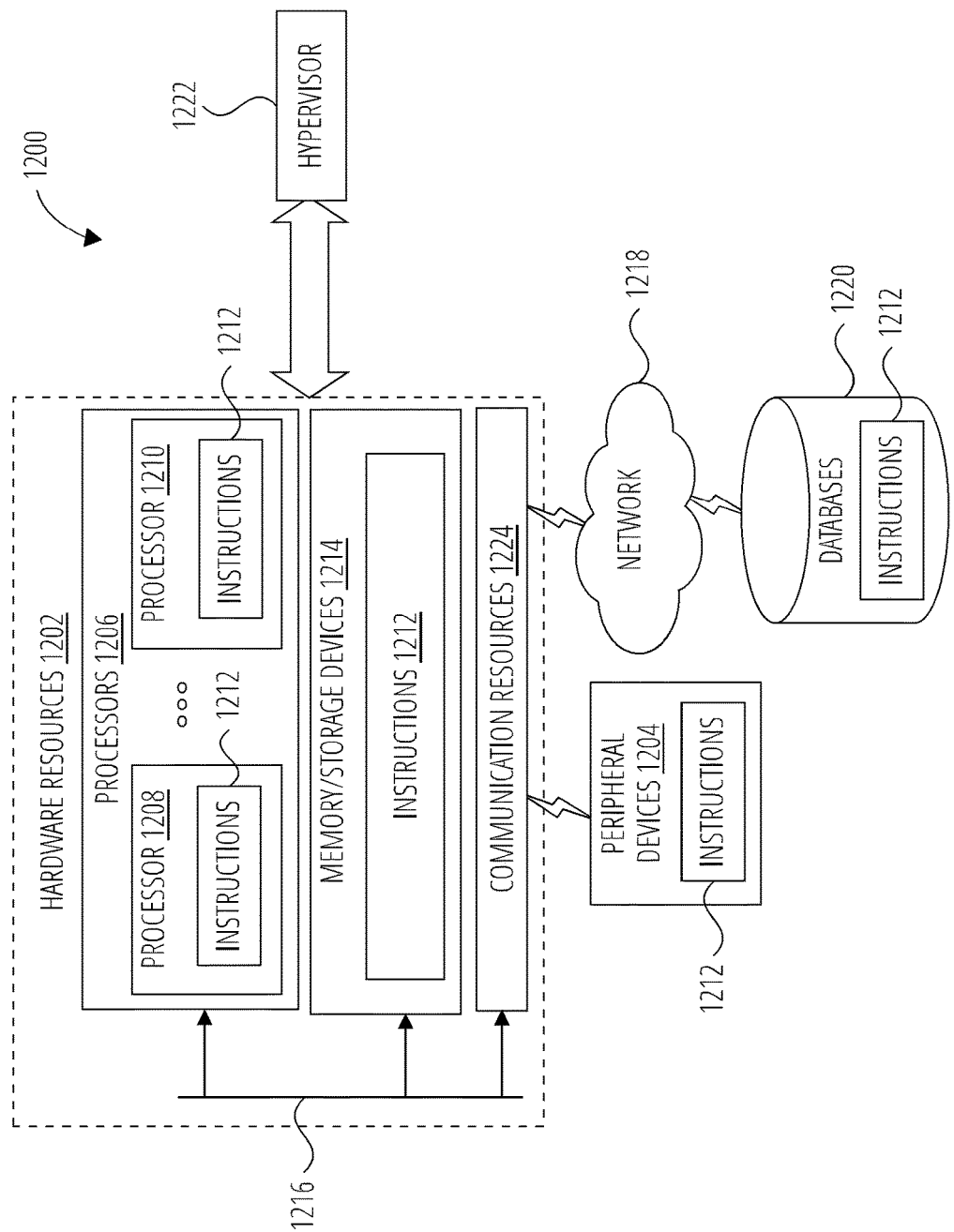
FIG. 12 illustrates components in accordance with one embodiment.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. The components 1200 may be used, for example, in a UE, a base station, or other communication system devices. Specifically, FIG. 12 shows a diagrammatic representation of hardware resources 1202 including one or more processors 1206 (or processor cores), one or more memory/storage devices 1214, and one or more communication resources 1224, each of which may be communicatively coupled via a bus 1216. For embodiments where node virtualization (e.g., NFV) is utilized, a hypervisor 1222 may be executed to provide an execution environment for one or more network slices/sub-slices to utilize the hardware resources 1202.

The processors 1206 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1208 and a processor 1210.

The memory/storage devices 1214 may include main memory, disk storage, or any suitable combination thereof. The memory/storage devices 1214 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1224 may include interconnection or network interface components or other suitable devices to communicate with one or more peripheral devices 1204 or one or more databases 1220 via a network 1218. For example, the communication resources 1224 may include wired communication components (e.g., for coupling via a Universal Serial Bus (USB)), cellular communication components (including transceivers and other wireless modem devices), NFC components, Bluetooth® components (e.g., Bluetooth® Low Energy), Wi-Fi® components, and other communication components.

Instructions 1212 may comprise software, a program, an application, an applet, an app, or other executable code for causing at least any of the processors 1206 to perform any one or more of the methodologies discussed herein. The instructions 1212 may reside, completely or partially, within at least one of the processors 1206 (e.g., within the processor's cache memory), the memory/storage devices 1214, or any suitable combination thereof. Furthermore, any portion of the instructions 1212 may be transferred to the hardware resources 1202 from any combination of the peripheral devices 1204 or the databases 1220. Accordingly, the memory of the processors 1206, the memory/storage devices 1214, the peripheral devices 1204, and the databases 1220 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 may include an apparatus comprising means to perform one or more elements of a method described in or related to any method or process described herein.

Example 2 may include one or more non-transitory computer-readable media comprising instructions to cause an electronic device, upon execution of the instructions by one or more processors of the electronic device, to perform one or more elements of a method described in or related to any method or process described herein.

Example 3 may include an apparatus comprising logic, modules, or circuitry to perform one or more elements of a method described in or related to any method or process described herein.

Example 4 may include an apparatus comprising: one or more processors and one or more computer-readable media comprising instructions that, when executed by the one or more processors, cause the one or more processors to perform the method, techniques, or process described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to perform uplink control information (UCI) multiplexing with physical layer (PHY) priority and logical channel (LCH) based prioritization, the method comprising:

assuming, at a PHY entity of the UE, a scheduling request (SR) status for a SR;

identifying, at the PHY entity of the UE, a target physical uplink shared channel (PUSCH) for UCI multiplexing based on PHY priority rules and the SR status that assumed by the PHY entity;

indicating, from the PHY entity to the MAC entity, a physical uplink control channel (PUCCH) resource Z and UCI contents of the PUCCH resource Z, wherein indicating the PUCCH resource Z includes indicating a starting symbol and a duration of a PUCCH corresponding to the target PUSCH, and wherein the UCI contents includes the SR;

receiving, at the PHY entity, transport blocks from the MAC entity; and generating, at the PHY entity, uplink transmissions for the transport blocks, wherein if the MAC entity does not generate a MAC protocol data unit (PDU) for the target PUSCH or another PUSCH corresponding to one of the transport blocks delivered by the MAC entity at least partially overlaps with the target PUSCH, and if the transmission of the PUCCH resource Z would overlap with any PUSCH on a same component carrier or on another component carrier, the PHY entity transmits neither the target PUSCH nor the PUCCH resource Z, wherein if the MAC entity does not generate the MAC PDU for the target PUSCH or another PUSCH corresponding to one of the transport blocks delivered by the MAC entity at least partially overlaps with the target PUSCH, and if the transmission of the PUCCH resource Z would not overlap with any PUSCH on the same component carrier or on another component carrier, the PHY entity transmits over the PUCCH resource Z, and wherein if the MAC entity generates the MAC PDU for the target PUSCH or the target PUSCH is without an uplink shared channel (UL-SCH) and is not dropped due to another PUSCH corresponding to one of the transport blocks delivered by the MAC entity, the PHY entity multiplexes the UCI, except for the SR, over the target PUSCH.

2. The method of claim 1, wherein identifying, at the PHY entity, the target PUSCH for UCI multiplexing is further based on at least one of channel state information (CSI) and a hybrid automatic repeat request-acknowledgement (HARQ-ACK).

3. The method of claim 2, further comprising selecting, at the PHY entity, the target PUSCH for UCI multiplexing to avoid overlapping of a HARQ-ACK PUCCH resource using a PUCCH format 1 and an SR PUCCH resource using the PUCCH format 1.

4. The method of claim 1, wherein the UCI contents further include at least one of hybrid automatic repeat request-acknowledgement (HARQ) feedback and channel state information (CSI).

5. The method of claim 1, wherein the UCI contents further include one or more SR resource identifier (ID) of one or more SR included in the PUCCH resource Z.

6. The method of claim 1, further comprising selecting, by the PHY entity, a dynamic grant (DG) PUSCH as a candidate for the target PUSCH for UCI multiplexing.

7. The method of claim 1, further comprising not selecting, by the PHY entity, configured grant (CG) PUSCHs as candidates for the target PUSCH for UCI multiplexing.

8. The method of claim 1, further comprising not selecting, by the PHY entity, semi-persistent channel state information (SP-CSI) PUSCHs as candidates for the target PUSCH for UCI multiplexing.

9. The method of claim 1, further comprising selecting, by the PHY entity, configured grant (CG) PUSCHs as candidates for the target PUSCH for UCI multiplexing.

10. The method of claim 9, further comprising selecting, by the PHY entity, a CG PUSCH occasion as one of the candidates for the target PUSCH when the CG PUSCH occasion does not overlap with a dynamic grant (DG) PUSCH candidate or a CG PUSCH candidate previously admitted to a set of hypothetical PUSCH transmissions.

11. The method of claim 10, further comprising selecting, by the PHY entity, semi-persistent channel state information (SP-CSI) PUSCH as one of possible candidates for the target PUSCH for UCI multiplexing when the PHY entity assumes that an overlapping SR is negative and when the SP-CSI PUSCH does not overlap with a previously admitted DG PUSCH or a previously admitted CG PUSCH.

12. The method of claim 11, further comprising, for each component carrier (CC), following a processing order to derive non-overlapping PUSCHs or PUSCH occasions in a slot to admit to the set of hypothetical PUSCH transmissions, wherein a candidate admitted earlier to the set of hypothetical PUSCH transmissions blocks a later overlapping PUSCH or later overlapping PUSCH occasion in the slot from being admitted to the set of hypothetical PUSCH transmissions.

13. The method of claim 12, wherein the processing order comprises processing dynamic grant (DG) PUSCHs, followed by CG PUSCH occasions with a CG configuration with slot aggregation or PUSCH repetition continuing from a previous slot (CG continuations), followed by new CG PUSCH occasions configured to start in the slot (new CG transmissions), and followed by the SP-CSI PUSCHs.

14. The method of claim 12, wherein the processing order comprises processing dynamic grant (DG) PUSCHs, followed by the SP-CSI PUSCHs, followed by CG PUSCH occasions with a CG configuration with slot aggregation or PUSCH repetition continuing from a previous slot (CG continuations), and followed by new CG PUSCH occasions configured to start in the slot (new CG transmissions).

15. The method of claim 12, wherein the processing order comprises processing dynamic grant (DG) PUSCHs, followed by CG PUSCH occasions with a CG configuration with slot aggregation or PUSCH repetition continuing from a previous slot (CG continuations), followed by the SP-CSI PUSCHs, and followed by new CG PUSCH occasions configured to start in the slot (new CG transmissions).

16. The method of claim 13, wherein the PHY entity independently derives, for high priority (HP) physical layer priority and low priority (LP) physical layer priority, the non-overlapping PUSCHs or PUSCH occasions in the slot to admit to the set of hypothetical PUSCH transmissions.

17. The method of claim 16, wherein when a selected LP PUSCH for UCI multiplexing overlaps with a selected HP PUSCH for UCI multiplexing, the MAC entity generates a single corresponding MAC PDU.

18. The method of claim 13, wherein the PHY entity derives the non-overlapping PUSCHs or PUSCH occasions in the slot to admit to the set of hypothetical PUSCH transmissions with a dependence between high priority (HP) physical layer priority and low priority (LP) physical layer priority, and wherein the PHY entity does not consider LP PUSCHs until selection of HP PUSCHs for admitting to the set of hypothetical PUSCH transmissions is complete.

19. The method of claim 13, wherein the PHY entity derives the non-overlapping PUSCHs or PUSCH occasions in the slot to admit to the set of hypothetical PUSCH transmissions with a dependence between high priority (HP)

physical layer priority and low priority (LP) physical layer priority, and wherein the PHY entity considers HP PUSCHs in selecting a LP PUSCH to admit to the set of hypothetical PUSCH transmissions.

20. A method for a user equipment (UE) to perform uplink control information (UCI) multiplexing with physical layer (PHY) priority and logical channel (LCH) based prioritization, the method comprising:
   determining, at a PHY entity of the UE, a scheduling request (SR) status for an SR based on whether an SR status indication is received from a media access control (MAC) entity of the UE;
   identifying, at the PHY entity of the UE, a target physical uplink shared channel (PUSCH) for UCI multiplexing based at least in part on PHY priority rules and the SR status;
   indicating, from the PHY entity to the MAC entity, a physical uplink control channel (PUCCH) resource Z and UCI contents of the PUCCH resource Z, wherein indicating the PUCCH resource Z includes indicating a starting symbol and a duration of a PUCCH corresponding to the target PUSCH, and wherein the UCI contents includes the SR;
   receiving, at the PHY entity, transport blocks from the MAC entity; and
   generating, at the PHY entity, uplink transmissions for the transport blocks,
   wherein if the MAC entity does not generate a MAC protocol data unit (PDU) for the target PUSCH or another PUSCH corresponding to one of the transport blocks delivered by the MAC entity at least partially overlaps with the target PUSCH, and if the transmission of the PUCCH resource Z would overlap with any PUSCH on a same component carrier or on another component carrier, the PHY entity transmits neither the target PUSCH nor the PUCCH resource Z,
   wherein if the MAC entity does not generate the MAC PDU for the target PUSCH or another PUSCH corresponding to one of the transport blocks delivered by the MAC entity at least partially overlaps with the target PUSCH, and if the transmission of the PUCCH resource Z would not overlap with any PUSCH on the same component carrier or on another component carrier, the PHY entity transmits over the PUCCH resource Z, and
   wherein if the MAC entity generates the MAC PDU for the target PUSCH or the target PUSCH is without an uplink shared channel (UL-SCH) and is not dropped due to another PUSCH corresponding to one of the transport blocks delivered by the MAC entity, the PHY entity multiplexes the UCI, except for the SR, over the target PUSCH.

* * * * *